(12) United States Patent
Biegert et al.

(10) Patent No.: US 8,983,308 B2
(45) Date of Patent: Mar. 17, 2015

(54) OPTICAL NETWORK DEVICE WITH MULTI-TRANSPORT SUPPORT

(75) Inventors: Mark R. Biegert, Maple Grove, MN (US); Peter O. Lee, Rogers, MN (US)

(73) Assignee: Calix, Inc., Petaluma, CA (US)

( * ) Notice: Subject to any disclaimer, the term of this patent is extended or adjusted under 35 U.S.C. 154(b) by 978 days.

(21) Appl. No.: 12/564,656

(22) Filed: Sep. 22, 2009

(65) Prior Publication Data

US 2011/0069956 A1    Mar. 24, 2011

(51) Int. Cl.
| | | |
|---|---|---|
| *H04B 10/69* | (2013.01) | |
| *H04J 14/02* | (2006.01) | |
| *H04B 10/66* | (2013.01) | |
| *H04Q 11/00* | (2006.01) | |

(52) U.S. Cl.
CPC ............ *H04J 14/0282* (2013.01); *H04B 10/66* (2013.01); *H04Q 11/0067* (2013.01); *H04J 14/0247* (2013.01); *H04J 14/0252* (2013.01); *H04J 14/0258* (2013.01); *H04J 14/0272* (2013.01); *H04Q 2011/0083* (2013.01)
USPC ........................................................ 398/202

(58) Field of Classification Search
CPC ......................................... H04B 10/66–10/69
USPC ......................................................... 398/202
See application file for complete search history.

(56) References Cited

U.S. PATENT DOCUMENTS

| 6,852,966 | B1 | 2/2005 | Douma et al. |
| 7,112,777 | B2 * | 9/2006 | Griffioen ............... 250/214 AG |
| 7,200,336 | B2 | 4/2007 | Yu et al. |
| 7,495,203 | B2 | 2/2009 | Kaku et al. |
| 7,609,967 | B2 | 10/2009 | Hochbaum et al. |
| 2001/0019102 | A1* | 9/2001 | Chikuma .................. 250/214 R |
| 2007/0183793 | A1* | 8/2007 | Zhao et al. .................... 398/212 |
| 2009/0190931 | A1* | 7/2009 | Hamano et al. ................. 398/99 |
| 2010/0067913 | A1* | 3/2010 | Niibe et al. ..................... 398/98 |

OTHER PUBLICATIONS

"Active Ethernet: Frequently Asked Question", EXFO, 2006.*
Meier et al., "Investigation of bandwidth limitations in separate absorption, charge and multiplication (SACM) avalanche photodiodes (APD)," Integrated Systems Laboratory, 2008, 2 pages.
A User Guide, "Understanding Avalanche photodiode improving system performance," Avalanche photodiode, Application Note, High Performance Sensors, 2006, 8 pages. www.optoelectronic.perkinelmer.com.

* cited by examiner

*Primary Examiner* — Shi K Li
(74) *Attorney, Agent, or Firm* — Shumaker & Sieffert, P.A.

(57) ABSTRACT

In general, this disclosure relates to optical network devices with support for multiple physical layer transport standards. An optical network device may include an optical receiver that can be adaptively configured to support different physical layer transport standards. For example, the optical receiver may include a photodiode and a control unit to adjust a characteristic of the photodiode to support different optical physical layer transport standards on an adaptive basis. For example, the control unit may adjust the photodiode characteristic to prevent an overload condition when an optical signal is received according to the physical layer access standard.

21 Claims, 11 Drawing Sheets

OPTICAL NETWORK DEVICE WITH MULTI-TRANSPORT SUPPORT

TECHNICAL FIELD

This disclosure relates to optical networking, and more particularly, optical physical layer transport devices.

BACKGROUND

Optical networking systems that communicate information over fiber optic links are common place. Examples of optical networking systems include passive optical networks (PONs) and Active Ethernet (AE) networks. Each type of optical networking system communicates information in accordance with an optical layer physical transport standard, sometimes referred to as an optical physical layer access standard. Various examples of PON physical layer transport standards include baseband PON (BPON) and gigabit PON (GPON). The PON standards may operate at different transfer rates. For example, the BPON standard specifies a transfer rate of 622 mega-bits per second (Mbps) and the GPON standard specifies transfer rates of 1.2 giga-bits per second (Gbps) or 2.4 Gbps. The AE standard specifies a transfer rate of 1.2 Gbps. In addition to transfer rates, the various standards also define maximum and minimum transmit and receive optical power levels, i.e., physical layer requirements. The various standards also define the manner in which the information is packaged for transmission and reception, i.e., data link layer requirements.

An optical networking system ordinarily includes either an optical line terminal (OLT), or an optical Ethernet switch (OES) with bi-directional optical interface located at or near a central office (CO) that transmits downstream voice, video, and/or data information to an optical network terminal (ONT) located at a subscriber premises such as a house or business. The ONT transmits upstream voice and/or data information from the subscriber premises to the OLT or OES. Generally, one OLT or OES transmits downstream information to multiple ONTs and receives upstream information from the multiple ONTs. In a PON, optical splitters and combiners are used to communicate optical signals among several ONTs and an OLT via the same optical fiber link. In an AE network, one or more optical Ethernet switches permit optical signals to be directed to individual ONTs via optical fiber links dedicated to the ONTs. In each case, the PON or AE ONT is configured to support the pertinent optical physical layer transport standard.

SUMMARY

In general, this disclosure relates to optical network devices with support for multiple physical layer transport standards. An optical network device may include an optical receiver that can be adaptively configured to support different physical layer transport standards. For example, the optical receiver may include a photodiode and a control unit to adjust a characteristic of the photodiode to support different optical physical layer transports on an adaptive basis. For example, the control unit may adjust the photodiode characteristic to prevent an overload condition when an optical signal is received according to the optical physical transport.

In one example, the disclosure provides a method comprising identifying, in an optical network device, an optical transport of an optical network coupled to the optical network device, and configuring, in the optical network device, an optical receiver of the optical network device to conform to an overload level of the identified optical transport based on the identification. The identified optical transport is one of a plurality of different optical transports, and the optical receiver is configurable to conform to overload levels for the plurality of different optical transports.

In another example, the disclosure provides an optical network device comprising an optical receiver, and a controller that identifies an optical transport of an optical network coupled to the optical receiver, and configures the optical receiver to conform to an overload level of the identified optical transport. The identified optical transport is one of a plurality of different optical transports, and the optical receiver is configurable to conform to overload levels for the plurality of different optical transports.

In another example, the disclosure provides a computer-readable medium containing instructions to cause a programmable processor to identify an optical transport of an optical network coupled to an optical network device, and configure an optical receiver of the optical network device to conform to an overload level of the identified optical transport based on the identification. The identified optical transport is one of a plurality of different optical transports, and the optical receiver is configurable to conform to overload levels for the plurality of different optical transports.

The details of one or more examples of the disclosure are set forth in the accompanying drawings and the description below. Other features, objects, and advantages will be apparent from the description and drawings, and from the claims.

DETAILED DESCRIPTION

Figure 1A:
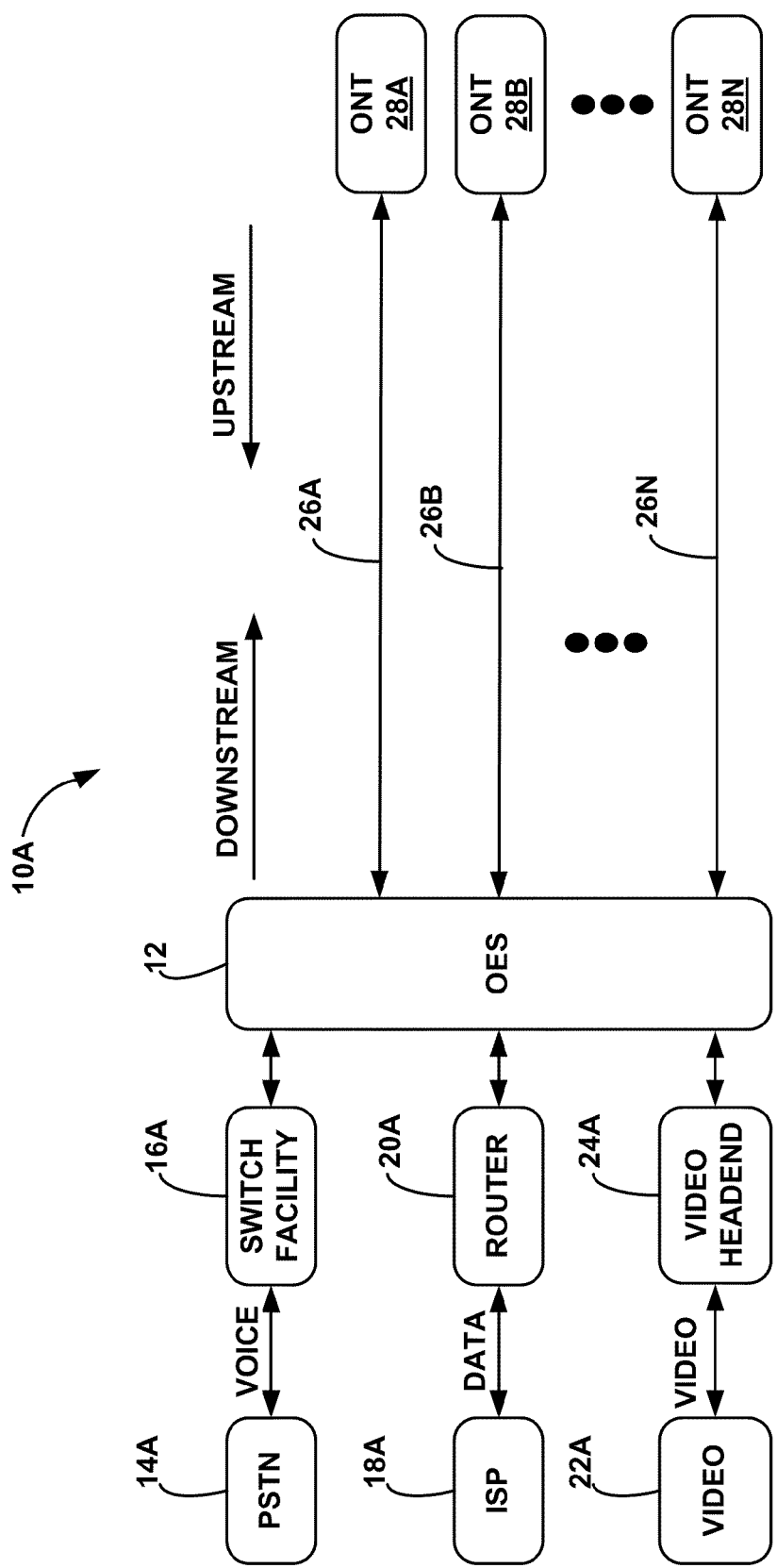
FIG. 1A is a block diagram illustrating an optical networking system.

This disclosure describes optical network devices, such as ONTs, that provide support for multiple physical layer transports, which may be standard or proprietary transports. In general, an optical transport may refer to the manner in which optical network devices such as ONTs, OLTs, and OESs communicate with one another. The optical transport may be configured for a particular optical transport standard which may include known transport standards or proprietary transport standards. An optical network device may include an optical receiver that can be adaptively configured to support multiple physical layer transports. In this manner, an optical network device may be deployed in different optical networking systems that use different optical transports. A control unit within the optical network device may selectively adjust a characteristic of a photodiode, such as a bias voltage, to configure the photodiode for use with a particular optical physical layer transport.

By adjusting a characteristic of a photodiode in the optical receiver, an optical network device may be adaptively configured to receive optical power in accordance with different optical transports without overloading. As an illustration, in one example implementation, the optical receiver may be adaptively configured to conform to the 622 Mbps BPON standard, the 1.2 Gbps GPON standard, the 2.4 Gbps GPON standard, or the 1.2 Gbps AE standard. An optical receiver that is configurable to conform to the various optical standards means that the optical receiver does not overload when driven in accordance with the various optical standards. Techniques described in this disclosure for configuration of an optical receiver to conform to the various standards listed above also may be extendable to support other transports, including existing, emerging or future transport standards. In some cases, an optical network device may be configured to support different standards via a simple software update that controls adjustment of the photodiode.

Various optical transport standards define an overload level and a sensitivity level for optical receivers. The sensitivity level defines the minimum allowable optical power that the optical receiver should be capable of receiving and detecting. Generally, the optical receiver is capable of functioning when receiving signals having optical power levels that are at or below the sensitivity levels defined by the various optical transport standards. However, the optical receiver may not function at the different overload levels defined by the various optical transport standards.

The overload level defines the maximum allowable optical power that the optical receiver should be capable of receiving and detecting. In other words, the optical receiver should function correctly to receive signals having optical power levels that are at or below the overload level. However, the overload level may be different for different optical transport standards. Accordingly, an optical receiver configured for a particular optical transport standard functions properly for that standard but may experience an overload condition if driven in accordance with a different optical transport standard.

The optical receiver experiences an overload condition when driven by high levels of optical power, i.e., optical power levels that are greater than the maximum allowable optical power for the receiver. The optical receiver includes a photodiode that converts the received optical power to an electrical current. A transimpedance amplifier (TIA) receives the electrical current to detect the presence of logic zeros and logic ones used in digital communication. In an overload condition, the photodiode generates relatively high levels of current. If the current level is too high (i.e., overload condition), the TIA cannot recover quickly enough between bits to properly detect the bits, causing an increase in the bit error rate (BER). If the BER is too high, the optical receiver cannot meet the BER requirements of the applicable transport standard.

In accordance with an aspect of this disclosure, a controller may be provided to set a characteristic of a photodiode within the optical receiver, based on the optical transport standard, so that the optical receiver is compliant with the optical transport standard or conforms to the requirements of the optical transport standard. The controller identifies the optical transport standard defining the optical transport applicable to the optical signals received by the optical receiver. The controller selects and applies an appropriate bias voltage to the photodiode based on the determined optical transport standard. The gain value of the photodiode is a function of the bias voltage applied to the photodiode and ambient temperature. A gain characteristic of the photodiode may be the gain value of the photodiode as a function of the applied bias voltage and ambient temperature. By setting a proper bias voltage for the photodiode, the controller sets the gain of the photodiode. The current generated by the photodiode is a function of the gain of the photodiode. The overload level of the optical receiver is a function of the current generated by the photodiode, which is a function of the gain of the photodiode. By properly setting the gain of the photodiode, the overload level of the optical receiver can be set to conform to the overload level defined by the various optical transport standards. In particular, if the gain is reduced, the photodiode may generate less current for a unit of optical power, such that the optical receiver may not enter an overload condition when the applied optical transport presents optical signals with relatively higher optical power levels.

To be standards compliant with multiple standards, the optical receiver should function within the optical power range defined by the overload and sensitivity levels of the various optical transport standards. As described above, by adaptively adjusting a bias voltage or other control input associated with a photodiode of an optical receiver, the optical receiver can be made to conform with both the sensitivity levels and overload levels defined by the various optical transport standards. In addition, the optical receiver may be adaptively configured in a similar manner to support customized or proprietary optical transports, if desired, as an alternative or in addition to optical transports defined by standards.

Techniques described in this disclosure may include setting the overload level of the optical receiver to conform to the overload level defined by the various optical transport standards. Accordingly, the techniques described in this disclosure may be applied to adaptively configure an optical receiver to be compliant with the various optical transport standards.

FIG. 1A is a block diagram illustrating an optical transport system 10A. As shown in FIG. 1A, optical transport system 10A can be arranged to deliver voice, data and video content (generally "information") to a number of network nodes via optical fiber links. As one example, optical transport system 10A may be an Active Ethernet (AE) system and may function in accordance with the AE standard. The AE standard is defined by IEEE 802.3ah. The AE standard defines the data rates for transmission and reception, the power levels for transmission and reception, and the manner in which the data is packaged for transmission and reception. In accordance with the AE standard, optical Ethernet switch (OES) 12 transmits information to and receives information from ONT 28A-28N (collectively referred to as ONTs 28) via fiber links 26A-26N (collectively referred to as fiber links 26). Fiber links 26 may be considered as a fiber bundle. ONTs 28 and OES 12 may be referred to as network interface units. OES 12 switches downstream packets to appropriate ONTs 28 via fiber links 26, and receive upstream packets from the ONTs via the fiber links. OES 12 is an active device.

Figure 1B:
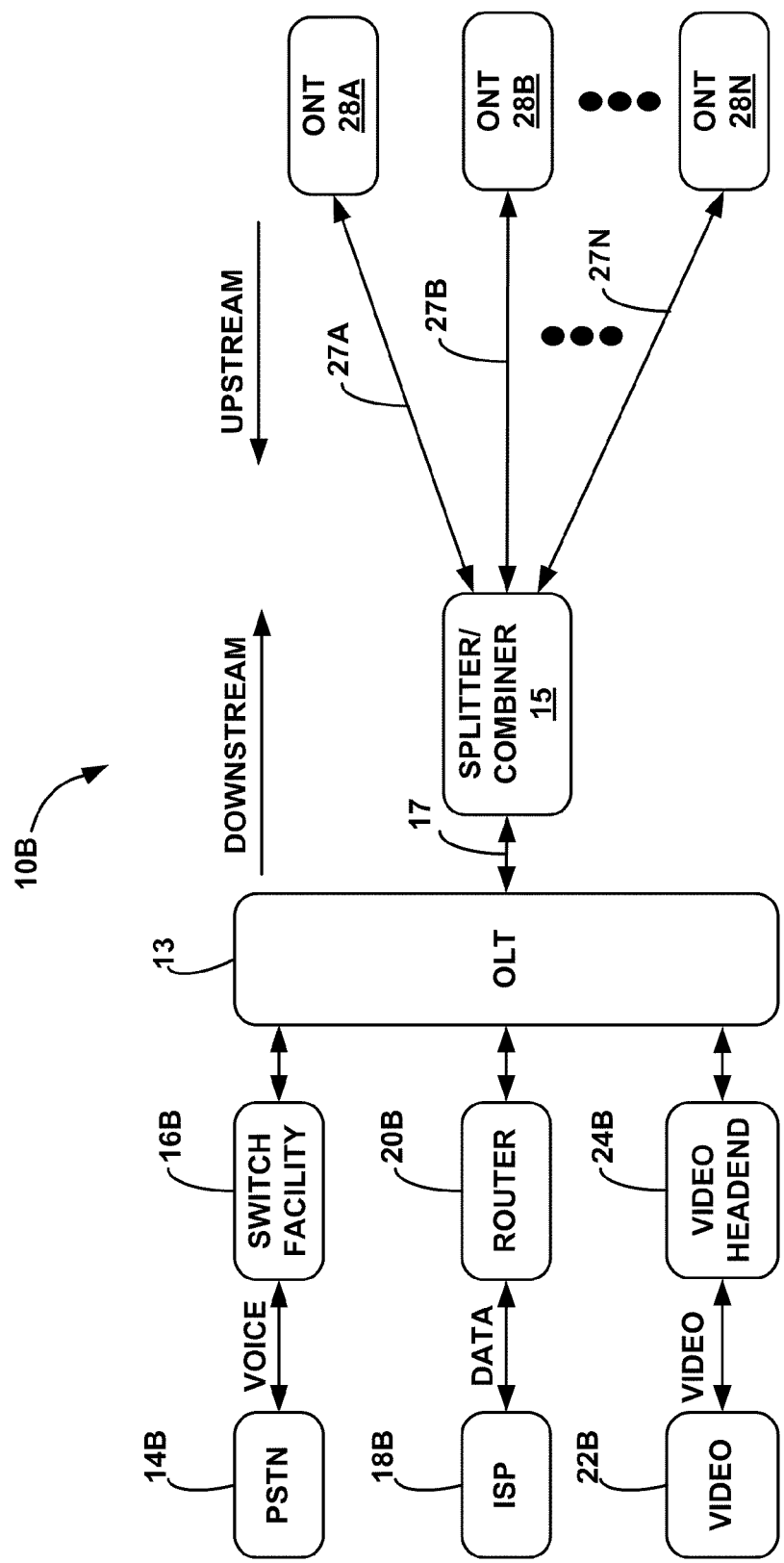
FIG. 1B is a block diagram illustrating another optical networking system.

FIG. 1B is a block diagram illustrating optical transport system 10B. Optical transport system 10B may be a passive optical network (PON), rather than an AE network as shown in FIG. 1A. In examples where optical transport system 10B is a PON, optical transport system 10B may function in accordance with the giga-bit PON (GPON), baseband PON (BPON), or Ethernet PON (EPON) standards, or other standards. The GPON, BPON, and EPON standards are defined by ITU-T G984.2 and G983.3, ITU-T 983.1, and IEEE 802.3ah, respectively. Similar to the AE standard, the GPON, BPON, and EPON standards define the data rates for transmission and reception, the power levels for transmission and reception, and the manner in which the data is packaged for transmission and reception.

As shown in FIG. 1A, OES 12 transmits and receives information via fiber links 26. However, in some examples, such as when the optical transport system is a PON, shown as optical transport system 10B in FIG. 1B, OES 12 may not be necessary and OLT 13 may transmit and receive information from ONTs 28. ONTs 28 of FIG. 1B are substantially similar to ONTs 28 of FIG. 1A. OLT 13 may not require multiple fiber links, e.g., fiber links 26 (FIG. 1A). Instead, in the case of a PON, OLT 13 transmits and receives information via single fiber link 17 that is accessible by multiple ONTs 28. Single fiber link 17 in optical transport system 10B couples OLT 13 to a splitter/combiner 15. To transmit downstream information, in a PON, OLT 13 transmits information to splitter/combiner 15 via single fiber 17. Splitter/combiner 15, in optical transport system 10B, splits the downstream optical information and propagates the information to each one of ONTs 28 via fiber links 27A-27N (collectively referred to as fiber links 27), and combines upstream information, received via fiber links 27, and propagates the information to OLT 13. For example, splitter/combiner 15 propagates information to ONT 28A via fiber link 27A, ONT 28B via fiber link 27B, and so on. Splitter/combiner 15 combines information received from ONT 28A via fiber link 27A with information received from ONT 28B via fiber link 27B, and so on. In other words, each one of ONTs 28 transmits and receives information via its respective one of fiber links 27 connected to splitter/combiner 15. To transmit upstream information, each one of ONTs 28 may transmit information at certain timeslots in accordance with time division multiple access (TDMA) protocols. Splitter/combiner 15 is a passive optical device.

Although the techniques described in this disclosure may be useful in different PONs and AE networks, the disclosure will generally refer to implementations in a PON network for purposes of illustration, e.g., optical transport system 10B. Where the optical transport system is an AE, as shown in FIG. 1A, OES 12 may be configured as an active Ethernet switch that transmits and receives information via the individual fiber links coupled to the various ONTs 28. In the AE example, there is not a shared fiber link that couples to multiple ONTs, and generally no need for a splitter/combiner. The approaches outlined in this disclosure may be applicable to a variety of AE and PON standards, as well as other proprietary standards, such that an ONT may be manufactured as a configurable device that can be deployed in different types of networks with different types of optical transports. In this disclosure, the manner in which the ONTs transmit and receive information may be different in different examples. For example, as shown in FIG. 1A, ONTs 28 transmit information to and receive information from OES 12 without splitter/combiner 15, and as shown in FIG. 1B, ONTs 28 transmit information to receive information from OLT 13 via splitter/combiner 15. Furthermore, the various PON and AE standards are provided for illustration purposes only, and should not be considered limiting of the techniques described in this disclosure. Techniques of this disclosure may be readily extendable to other optical transport standards as well.

ONTs 28 include hardware for receiving information over optical transport system 10A and 10B via optical fiber links 26 and 27, and delivering the information to a connected subscriber device, or one or more connected devices. For example, each ONT 28 may serve as an access point for one or more computers, network appliances, televisions, set-top boxes, wireless devices, or the like, for video and data services. In addition, each ONT 28 may be connected to subscriber telephones for delivery of telephone services. Hence, ONTs 28 may support transmission of digital video packets to support television applications, digital data packets to support Internet access, and digital voice packets to support telephone services. In some cases, video services may be supported by transmission of radio frequency (RF) video. The information supporting the voice, video and data services may be transmitted in the same optical bands or different optical frequency bands. OES 12 may be located near or far from ONTs 28. In some existing networks, however, OES 12 may reside in a central office (CO) situated within approximately twelve miles from each ONT 28. Similar to OES 12, OLT 13 may be located near or far from ONTs 28 and may reside in a CO situated within approximately twelve miles from each ONT 28.

An ONT 28 may be located at any of a variety of locations, including residential or business sites. In addition, in some examples, a single ONT 28 may operate on a shared basis to deliver information to two or more closely located residences or businesses via copper or additional optical fiber connections, either directly or via a network hub, router or switch. Each ONT 28 also may include hardware for transmitting information over optical network system 10A and 10B. For example, an ONT 28 may transmit and receive voice information over PSTN 14A via OES 12 and switch facility 16A in the course of a telephone conversation. Also, an ONT 28 may transmit and receive data to and from a variety of nodes on the Internet via ISP 18A, router 20A and OES 12. Similarly, an ONT 28 may transmit receive voice information over PSTN 14B via OLT 13 and switch facility 16B in the course of a telephone conversation. Also, an ONT 28 may transmit and receive data to and from a variety of nodes on the Internet via ISP 18B, router 20B and OLT 13. In some examples, ONTs 28 transmit upstream data at a light wavelength of approximately 1310 nanometers (nm).

OES 12 may transmit and receive voice information, for example, via the public switched telephone network (PSTN) 14A and a switch facility 16A. In addition, OES 12 may be coupled to one or more Internet service providers (ISPs) 18A via the Internet and a router 20A. As further shown in FIG. 1A, OES 12 may receive video content 22A from video content suppliers via a streaming video headend 24A. In each case, OES 12 receives the information, and distributes it to ONTs 28.

Similar to OES 12, OLT 13 may transmit and receive voice information, for example, via PSTN 14B and a switch facility 16B. In addition, OLT 13 may be coupled to one or more ISPs 18B via the Internet and a router 20B. As further shown in FIG. 1B, OLT 13 may receive video content 22B from video content suppliers via a streaming video headend 24B. In each case, OLT 13 receives the information, and distributes it to ONTs 28.

To transmit and receive information, OES 12 and OLT 13 include a plurality of transceivers that transmit information to and receive information from ONTs 28. Similarly, to transmit and receive information, each one of ONTs 28 includes a transceiver that transmits information to and receives information from OES 12 and OLT 13, respectively. Each transceiver, within OES 12, OLT 13, or ONT 28, includes an optical transmitter and an optical receiver. The various PON and AE standards define the operational parameters for the optical transmitters and receivers in OES 12 and OLT 13 and the optical transmitters and receivers in each one of ONTs 28. For example, the various PON and AE standards define physical layer functions, or layer 1 functions, of the open systems interconnection (OSI) model. The various PON and AE standards also define data link functions, or layer 2 functions of the OSI model.

The standards define an optical power range for the transmitters and receivers within OES 12, OLT 13, and ONTs 28, i.e., the physical layer functions. To conform to a standard, the optical transmitters should output optical power within the optical power range defined by the standard. To be compliant with a standard, the optical receivers should be capable of receiving optical power within the optical power range defined by the standard.

The optical power range within which the optical receiver must function properly may comprise a sensitivity level and an overload level. The sensitivity level defines the minimum optical power that the optical receiver should be capable of receiving and detecting. The optical receiver should function properly when it receives the minimum allowable optical power. The optical receiver is not required to function properly if it receives optical power less than the minimum allowable optical power. However, the optical receiver may be capable of functioning properly, e.g., the bit error rate (BER) is less than the BER requirement for the applicable optical transport standard, even if it receives optical power at less than the minimum allowable optical power level.

The overload level defines the maximum optical power level that the optical receiver should be capable of receiving and detecting. The optical receiver should function properly when it receives the maximum allowable optical power, e.g., overload level. The optical receiver is not required to function properly if it receives optical power at a level greater than the maximum allowable optical power level.

Table 1 provides an illustration of the optical power ranges for the optical transmitters and optical receivers in OES 12, OLT 13, and ONTs 28, i.e., in the optical network devices, for 622 Mbps, BPON, 1.2 Gbps GPON, 2.4 Gbps GPON, and 1.2 Gbps AE optical transport standards. The optical power is provided in decibels of power referenced to one milli-Watt (dBm).

For the 1.2 Gbps AE optical standard, the OES transmit power range covers the power range for small-form factor pluggable (SFP) transmitters that may transmit to different distances. The SFP transmitter may transmit data at a light wavelength centered at approximately 1490 nm. The distances may be 20 kilometers (km), 40 km, and 60 km. The minimum OES transmit power of −7 dBm may be for transmitters that transmit 20 km and the maximum OES transmit power of 4 dBm may be for transmitters that transmit 60 km.

As shown in Table 1, the different optical transport standards define different transmit power ranges and receive power ranges, i.e., physical layer requirements, of the BPON, GPON and AE optical transport standards. An optical receiver configured for a particular standard may not operate if driven in accordance with a different standard. For example, assume that OES 12 is configured to function in accordance with the 1.2 Gbps AE standard and ONT 28A is configured to function in accordance with the 2.4 Gbps GPON standard. Further, assume that there is 2 dB of optical power loss on fiber link 26A.

In this example, the optical transmitter in OES 12 transmits information at 1.2 Gbps and −3.0 dBm optical power in accordance with the 1.2 Gbps AE standard. The optical receiver in ONT 28A is capable of receiving information at 1.2 Gbps because ONT 28A is capable of receiving information at transfer rates up to 2.4 Gbps. However, the optical receiver in ONT 28A may experience an overload condition. Due to the optical loss caused by fiber link 26A, the optical receiver in ONT 28A receives −5 dBm of optical power (−3 dBm −2 dB). As shown in Table 1, the overload level for the optical receiver in ONT 28A is −8 dBm because ONT 28A is configured to function in accordance with the 2.4 Gbps GPON standard. Accordingly, the optical receiver in ONT 28A may experience an overload condition, i.e., the received optical power is greater than the maximum allowable receive power, when it is used in conjunction with the AE standard.

Although ONT 28A is configured to function in accordance with the 2.4 Gbps GPON standard in this example, the optical transmitter in ONT 28A may still be capable of transmitting information at 1.2 Gbps because ONT 28A is capable of transmitting information at transfer rates up to 2.4 Gbps. In this example, if the optical transmitter in ONT 28A transmits information at 5 dBm, the optical receiver in OES 12 receives 3 dBm of optical power (5 dBm −2 dB). The overload level of the optical receiver in OES 12 is 0 dBm because OES 12 is configured to function in accordance with the 1.2 Gbps AE standard. Accordingly, the optical receiver in OES 12 may experience an overload condition, i.e., the received optical power is greater than the maximum allowable receive power.

The overload condition may cause the optical receivers of ONT 28A and OES 12 to output erroneous bits. The optical receivers, in OES 12, OLT 13, and ONTs 28, each include a photodiode and a transimpedance amplifier (TIA). The photodiode receives the optical power and converts it to an electrical current. The TIA receives the electrical current and

TABLE 1

| OPTICAL TRANSPORT STANDARD | ONT Transmit Power Range (dBm) | | ONT Receive Sensitivity Range (dBm) | | OLT or OES Transmit Power Range (dBm) | | OLT or OES Receive Sensitivity Range (dBm) | |
|---|---|---|---|---|---|---|---|---|
| | Min | Max | Overload | Max | Min | Max | Overload | Max |
| 622 Mbps BPON | −2.0 | 4.0 | −6.0 | −28.0 | 0.0 | 4.0 | −8.0 | −28.0 |
| 1.2 Gbps GPON | −1.0 | 4.0 | −4.0 | −25.0 | 1.0 | 6.0 | −6.0 | −27.0 |
| 2.4 Gbps GPON | 0.5 | 5.0 | −8.0 | −27.0 | 1.5 | 6 5.0 | −8.0 | −28.0 |
| 1.2 Gbps AE | −9.0 | −3.0 | 0.0 | −20.0 | −7.0 | 4.0 | 0.0 | −30.0 | detects the presence of logic ones and logic zeros. In an overload condition, the photodiode generates a relatively high current level. If the current level is too high, i.e., overload condition, the TIA may not be capable of recovering quickly enough between bits to properly detect the logic ones and logic zeros. Accordingly, there may be many bit errors in the output of the TIA, which may result in corrupted data.

In accordance with some aspects of the disclosure, the optical receiver in OES 12, OLT 13, and/or each of ONTs 28 may be configurable to support optical power levels associated with different optical transports on a selective basis, and therefore be compliant with various optical transport standards. In particular, the optical receiver may be selectively configured to conform to the overload level and sensitivity level defined by a particular optical transport, e.g., GPON or AE. To conform to the overload level, the photodiode of the optical receiver should generate current levels that are receivable and detectable by the TIA when the photodiode is driven with the maximum optical power, e.g., overload level, defined by the optical transport standards. Hence, as an illustration, if an ONT or OLT is deployed in a GPON network, the optical receiver may be adaptively configured to support sensitivity and overload levels specified for the GPON optical transport. Alternatively, if the ONT or OES is deployed in an AE network, the optical receiver may be adaptively configured to support sensitivity and overload levels specified of the AE optical transport. In this manner, ONTs, OLTs, or OESs may be deployed with configurable optical receivers that permit them to be readily and flexibly deployed in different types of networks. In some cases, the ability to configure or adapt the optical receiver to different optical transports may eliminate or reduce the need to manufacture and stock ONTs, OESs, or OLTs with optical receivers that are dedicated in a fixed manner to a particular optical transport.

In many cases, the optical receiver in OES 12, OLT 13, or ONTs 28 may already be compliant with the sensitivity levels defined by various standards. However, the optical receiver may need to be adaptively configured to conform to the overload levels defined by the particular optical transport with which the optical receiver is used in a particular installation. To change the overload level of the optical receiver so that the optical receiver is adaptively compliant with different standards, the techniques described in this disclosure may be applied to vary a current generated by the photodiode based on the optical transport standard. As described above, in an overload condition, the current generated by the photodiode is too high and the logic ones and zeros indicated by the current cannot be properly detected by the TIA. The current generated by the photodiode is a function of the gain characteristic of the photodiode. The gain of the photodiode is a function of the bias voltage applied to the photodiode and ambient temperature.

A controller, as described in this disclosure, may be configured to set the bias voltage applied to the photodiode based on the optical transport standard and ambient temperature. For example, if the optical receiver needs to be configured for the 2.4 Gbps GPON standard, the controller sets the bias voltage applied to the photodiode at a first voltage level that is determined to produce an output current within overload limits. When the bias voltage is set to the first voltage level, the photodiode generates a first current level if the input power is equal to −8 dBm, i.e., the overload level of the 2.4 Gbps GPON standard. If the optical receiver needs to be configured for the 1.2 Gbps AE standard, the controller sets the bias voltage applied to the photodiode at a second voltage level. When the bias voltage is set to the second voltage level, the photodiode generates a second current level if the input power is equal to 0 dBm, i.e., the overload level of the 1.2 Gbps AE standard. When the photodiode current is controlled to be less than or equal to the maximum current level the TIA can detect, the TIA is capable of recovering quickly between logic ones and logic zeros to detect the logic ones and logic zeros. Accordingly, in this example, the optical receiver is configurable to conform to the overload levels defined by both the 2.4 Gbps GPON standard and the 1.2 Gbps AE standard. In one example, the first current level and second current level produced in the GPON and AE scenarios may be substantially the same current levels, even though the input optical power levels may be substantially different.

As mentioned above, an optical receiver that is compliant with various optical transport standards may allow a manufacturer of ONTs, OESs, or OLTs, i.e., optical network devices, to use a single type of optical receiver rather than different types of optical receivers configured for different optical standards. As described in more detail below, this disclosure also describes techniques for configuring an optical transmitter that is compliant with the various optical transport standards. In accordance with this disclosure, the manufacturer of ONTs, OESs, or OLTs may build one type of ONT, OES, and OLT that are compliant with various optical standards.

Having different types of ONTs, OESs, or OLTs configured for each optical transport standard may be problematic for a technician installing the ONTs, OESs, or OLTs. The technician could select an ONT that is configured for the 2.4 Gbps GPON standard, believing that it is configured for the 1.2 Gbps AE standard and install the ONT in an optical transport system that is configured in accordance with 1.2 Gbps AE standard. Having only one type of ONT, OES, or OLT that is configurable to be compliant for the various optical standards may reduce these types of installation errors.

Furthermore, in some examples, the techniques described in this disclosure may provide for an optical receiver that is configurable to be compliant for various optical transport standards without the need for additional external components like optical attenuators. An optical attenuator may be placed in front of the optical receiver to attenuate the optical power. By attenuating the optical power, the optical receiver may not experience an overload condition.

However, utilizing optical attenuators or other external components may be problematic for several reasons. Optical attenuators are expensive and may increase the cost of the optical receiver. The technician may be required to place the optical attenuators on every single optical receiver while installing an ONT, OES, or OLT. Due to human error, the technician may incorrectly place the optical attenuator or place an incorrect attenuator that attenuates the optical signal too much or not enough.

In addition, selecting the appropriate attenuator is problematic in itself. There may be some optical attenuation through fiber links 26 or 27. The optical attenuation through fiber links 26 or 27 is a function of the length of fiber links 26 or 27. The longer the length of fiber links 26 or 27, the more fiber links 26 or 27 attenuate the optical power. Therefore, different optical attenuators may need to be selected for optical receivers in ONTs, OES, or OLTs based on the distance between the ONT and the OES or ONT and OLT, i.e., based on the length of fiber links 26 or 27. For at least some of these reasons, an optical receiver that is configurable to be compliant with the various optical standards without the need for external components or selective installation may be beneficial.

Figure 2:
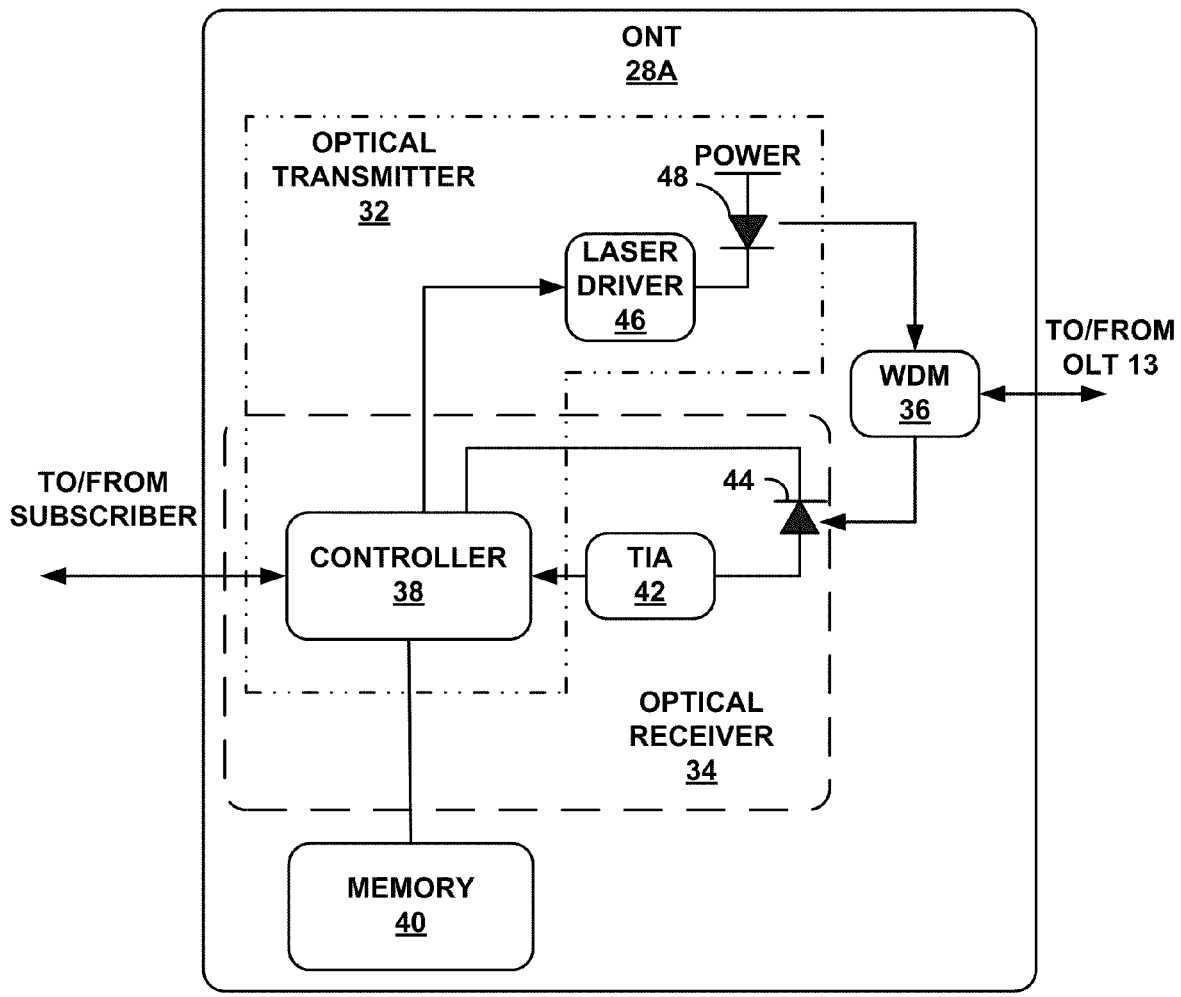
FIG. 2 is a block diagram illustrating an example optical network device.

FIG. 2 is a block diagram illustrating an example ONT 28A. ONT 28A includes optical transmitter 32, optical receiver 34, wavelength division multiplexer (WDM) 36, controller 38, and memory 40. ONTs 28B-28N may include substantially similar components as ONT 28A shown in FIG. 2. As shown in FIG. 2, optical transmitter 32 and optical receiver 34 both share a common controller 38. In some examples, rather than sharing a common controller 38, optical transmitter 32 and optical receiver 34 may each comprise individual controllers.

For upstream transmission of information, such as voice and data service information, controller 38 receives data from one or more subscriber devices such as Internet data terminals, e.g., cable modems, or telephones within the subscriber premises. Subscriber devices are sometimes referred to as customer premises equipment (CPE). ONT 28A may be coupled to subscriber devices via one or more wired or wireless connections. Controller 38 packages the information and provides the information to laser driver 46, i.e., performing data link layer, or layer 2 functions. Laser driver 46 converts the information to an electrical current that drives laser 48 to generate an optical signal. The functionality of laser driver 46 and laser 48 is explained in more detail with respect to FIG. 9. The wavelength of the optical signal generated by optical transmitter 32, e.g., laser 48, may be in a band centered at approximately 1310 nm in some examples. Optical transmitter 32 transmits the optical signal to OLT 13 via WDM 36 and optical fiber link 27A.

For downstream reception of voice, video, and data information, WDM 36 receives an optical signal from OLT 13 via WDM 36 and optical fiber link 27A. The power level of the optical signal may be within the range defined by the various optical transport standards, i.e., the physical layer requirement. The wavelength of the optical signal received by WDM 36 may be 1490 nm in some examples. WDM 36 provides the optical signal to optical receiver 34. Photodiode 44 converts the optical signal to an electrical current and provides the electrical current to transimpedance amplifier (TIA) 42. One example of photodiode 44 is an avalanche photodiode (APD). TIA 42 converts the electrical current to an electrical voltage signal and provides the electrical voltage signal to controller 38. Controller 38 may reassemble electrical voltage signals into data units, such as packets, and provide the data units to one or more devices, e.g., telephones, Internet data terminals, and television set-top boxes, within the subscriber premises.

The electrical current level generated by photodiode 44 is based on characteristics of the photodiode. The characteristics include the responsivity and gain of photodiode 44. The electrical current level generated by photodiode 44 can be calculated based on equation (1) below.

$$Iout = M \cdot Ro(\lambda) \cdot Pin \quad (1)$$

In equation (1) above, $P_{in}$ is the optical power level that photodiode 44 receives from an optical transmitter. The optical power level, $P_{in}$, is defined by the various transport standards. For example, for the 2.4 Gbps GPON standard, $P_{in}$ may be within the range of −8 dBm to −27 dBm. One method of changing $P_{in}$ is to add an optical attenuator to optical receiver 34. However, adding optical attenuators may be problematic for the reasons explained above. Otherwise, the $P_{in}$ value is fixed by the optical transmitter and cannot be changed at the optical receiver end.

$R_o$ is the intrinsic responsivity characteristic of photodiode 44. $R_o$ is a function of the wavelength of the input optical signal. For photodiode 44, as one example, the responsivity is approximately 0.9 for optical signals transmitted in a band centered at 1490 nm. The responsivity may be different for different types of photodiodes. The responsivity is set during manufacturing of the photodiode and generally cannot be changed after photodiode 44 is manufactured.

Figure 3:
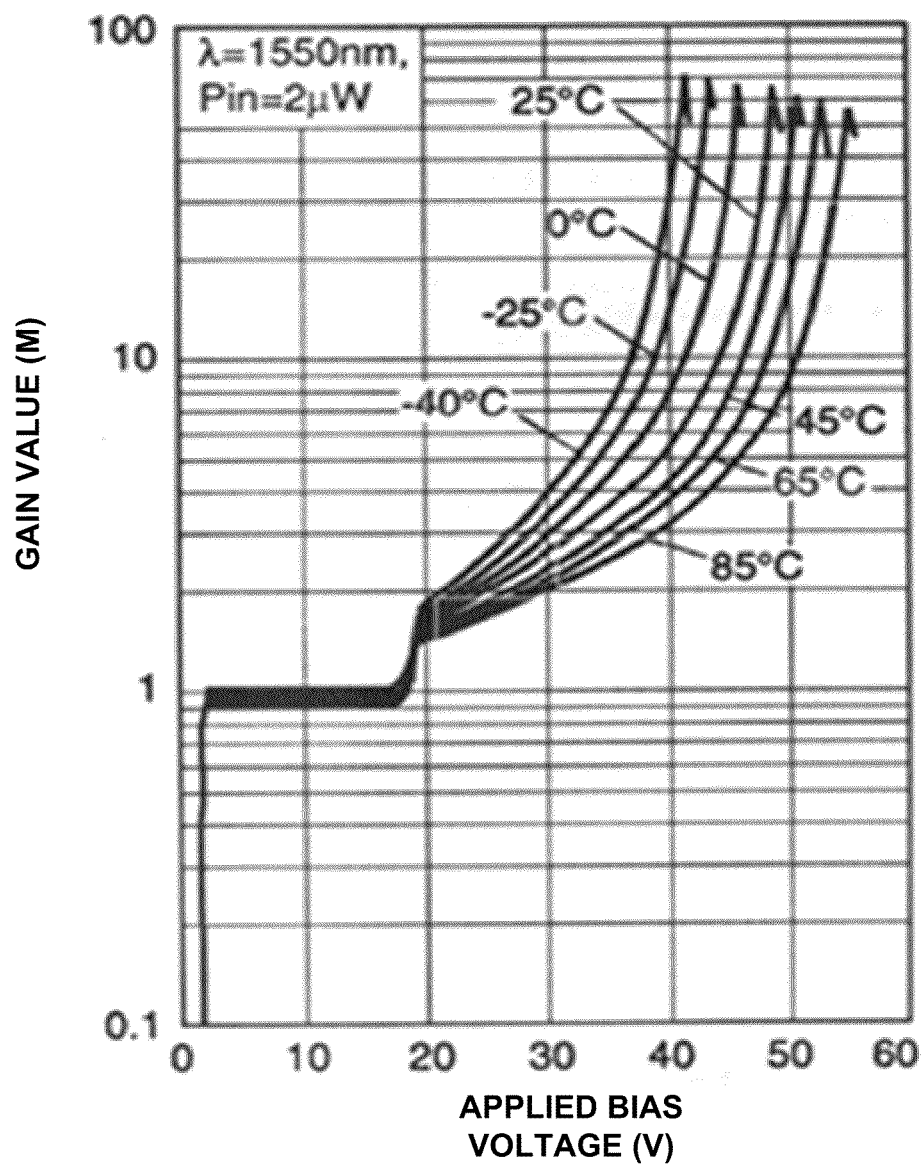
FIG. 3 is a graph illustrating a relationship between gain, applied bias voltage and ambient temperature for an avalanche photodiode in an optical receiver.

M is the gain characteristic of photodiode 44. The gain characteristic may also be referred to as a multiplication factor. The gain characteristic is a function of the bias voltage applied to photodiode 44 and ambient temperature. FIG. 3 shows an example of the relationship between the gain, i.e., M, and the applied bias voltage and ambient temperature.

As noted above, the overload level of optical receiver 34 is a function of the current generated by photodiode 44. As can been seen from the above equation, the current generated by photodiode 44 is a function of the gain characteristic M and M is a function of the bias voltage applied to photodiode 44 and ambient temperature. Accordingly, the overload level of optical receiver 34 can be set by selecting the appropriate bias voltage for photodiode 44 for a given ambient temperature.

As shown in FIG. 2, controller 38 sets the bias voltage applied to photodiode 44. Memory 40 stores the appropriate bias voltage level that controller 38 should apply to photodiode 44 for a given transport standard and ambient temperature. In particular, memory 40 may store a plurality of different bias voltage levels for different optical transport standards and different ambient temperatures. Memory 40 may be a computer-readable storage medium comprising data indicating different bias voltage levels and instructions that cause one or more processors, e.g., controller 38, to perform various functions. Examples of memory 40 include both static memory (e.g., FLASH memory, EPROM, EEPROM, etc.) and dynamic memory (e.g., RAM, DRAM, SRAM, etc.), or any other computer-readable storage medium capable of storing instructions that cause the one or more processors to perform the techniques described in this disclosure.

The appropriate bias voltage level that should be applied to photodiode 44 for a given optical transport standard and ambient temperature may be predetermined and stored in memory 40, either during the manufacture of optical receiver 34 or ONT 28A, or upon or following installation of ONT 28A, e.g., by downloading bias voltage level data from a remote server. The following is description of a first example technique to determine the appropriate bias voltage that should be applied to photodiode 44. The first example technique may be implemented by an engineer, a technician, or a computing device executing software. For ease of description, the technique is described as being implemented by a technician.

To determine the appropriate bias voltage that should be applied to photodiode 44, photodiode 44 may be tested by a technician to determine its gain characteristic. After photodiode 44 is manufactured, a technician may test photodiode 44 to determine the output current level for different applied bias voltages and ambient temperatures. For example, the technician may drive photodiode 44 at a fixed optical power level, e.g., 2 micro-watts (μW) and at an initial ambient temperature, e.g., −40° centigrade (C). The technician applies a bias voltage to photodiode 44, measures the output current level, and records the measured output current level. The technician then changes the bias voltage level, measures the output current level, and records the output current level. Typically, the range of the bias voltage level is 20 volts to 50 volts. In one example, the initial bias voltage level may be 20 V. The technician measures the output current level when the bias voltage level is 20 V. The technician may increment the bias voltage in steps of 1 V, as one non-limiting example, and measure the output current at each incremental level. In different examples, the increment may be less than or greater than 1 V. The technician may increase the bias voltage up to 50 V in this example.

Next, the technician may vary the temperature for each bias voltage level. The temperature range may be –40° C. to 85° C. For example, the initial temperature may be –40° C. The technician may increase the ambient temperature in steps of 1° C. In different examples, the increment may be less than or greater than 1° C. The technician may increase the ambient temperature up to 85° C. For every ambient temperature increment, the technician may vary the bias voltage from 20 V to 50 V and measure and record the output current for each voltage increment. The technician may calculate the gain characteristic for photodiode 44, i.e., M, as a function of bias voltage and temperature by dividing the output current level by the input power level, i.e., $P_{in}$ which is 2 μW in this example and the responsivity, i.e., $R_o$ which is 0.9 in this example.

In some examples, multiple different photodiodes of the same type, e.g., the same type as photodiode 44, may be tested in the same manner as described above. The gain characteristic of each photodiode may be recorded. An average may be taken of gain values. It may be assumed that any new photodiode that is of the same type of photodiode as photodiode 44 will exhibit similar gain characteristics as the average gain characteristic values taken from the tested photodiodes.

The technician may not vary the input power level applied to photodiode 44 because the gain characteristic, i.e., M, may be approximately the same regardless of the input power level. At this point, the gain values are recorded for photodiode 44 for various bias voltage levels and ambient temperatures. In this manner, the gain characteristic is known for photodiode 44. After the gain characteristic is known, the bias voltage that should be applied to photodiode 44 can be calculated. However before description of the bias voltage that should be applied to photodiode 44, a brief description of TIA 42 is provided below.

TIA 42 receives current signals from photodiode 44, converts the current signal to a voltage signal, and provides the voltage signal to controller 38. TIA 42 may be designed to function properly over a range of data rates and current levels. In other words, TIA 42 may be a multi-rate TIA. For example, TIA 42 may function properly up to data rates of 2.4 Gbps. TIA 42 may have sufficient bandwidth to properly detect logic ones and logic zeros for the various optical transport standards described in this disclosure, assuming a maximum data rate, e.g., 2.4 Gbps for GPON. In examples where the optical transport standard requires bandwidth that is greater than 2.4 Gbps, e.g., 10 Gbps, an appropriate TIA 42 may be selected that is capable of functioning properly for data rates less than or equal to 10 Gbps.

TIA 42 functions properly for input current levels that are within a minimum input current level and a maximum input current level. TIA 42 may not be capable of properly detecting logic ones and logic zeros if the input current level is less than the minimum input current level or if the input current level is greater than the maximum input current level. If the input current level is greater than maximum input current level, optical receiver 34 may experience an overload condition.

In accordance with various aspects of this disclosure, the appropriate bias voltage that should be applied to photodiode 44 may be determined for a given transport standard so that the current generated by photodiode 44 is within the maximum and minimum input current levels of TIA 42. As one example, the maximum input current level for TIA 42 may be 2 milli-amps (mA). The maximum input current level for TIA 42 may be different than 2 mA, but the maximum input current level for TIA 42 may be known to the technician. For example, the manufacturer of TIA 42 may provide the maximum input current level of TIA 42. As noted in Table 1, for the 622 Mbps BPON standard, the maximum input power for optical receiver 34 is –6 dBm. The gain, i.e., M, may then be determined such that the current generated by photodiode 44 is less than or equal to 2 mA when the input power is –6 dBm and optical transport system 10B (FIG. 1B) is configured in accordance with the 622 Mbps BPON standard.

The gain value may be calculated by first converting –6 dBm to watts. The equation to convert dBm to watts is presented in equation (2) below:

$$10^{\wedge}(dBm/10) * 1 \text{ mW} \qquad (2)$$

An input power level of –6 dBm equals approximately 0.251 milli-watts (mW). By simplifying equation (1), M equals $I_{out}/(R_o * P_{in})$. In this example, the maximum allowable input current to TIA 42 is 2 mA. Accordingly, the desired $I_{out}$ from photodiode 44 equals 2 mA. $R_o$ is 0.9 and $P_{in}$ is 0.251 mW.

In this example, M equals approximately 8.8, i.e., 2 mA/(0.9*0.251 mW). As previously described, the gain values are recorded for photodiode 44 for various bias voltage levels and ambient temperatures. The technician may determine the bias voltage levels at different temperatures that produce a gain value of 8.8. The technician may associate the 622 Mbps BPON transport standard with the different bias voltage levels at different temperatures that produce the gain value of 8.8. The technician may store the bias voltage levels and temperature values that produce the gain value of 8.8 in memory 40. In accordance with this disclosure, controller 38 selects and applies one of bias voltage levels stored in memory 40, based on the ambient temperature, that is associated with the 622 Mbps BPON standard when optical transport system 10B is configured for the 622 Mbps BPON standard. In this manner, controller 38 selects and applies the bias voltage level to photodiode 44, for a given ambient temperature, such that the gain characteristic of photodiode 44 is 8.8. If the gain characteristic of photodiode 44 and the input power level is –6 dBm in accordance with 622 Mbps GPON standard, then photodiode 44 may generate approximately 2 mA, which is less than or equal the maximum current level of TIA 42. Accordingly, optical receiver 34 may not experience an overload condition because TIA 42 is capable of functioning properly when photodiode 44 receives –6 dBm of optical power and the optical transport standard is the 622 Mbps BPON standard.

As another example, for the 1.2 Gbps AE standard, the maximum input power for optical receiver 34 is 0 dBm. The gain may be determined such that the electrical current generated by photodiode 44 is less than or equal to 2 mA, as one non-limiting example, when the input power is 0 dBm and optical transport system 10A is configured in accordance with the 1.2 Gbps AE standard.

The gain value for the 1.2 Gbps AE standard may be calculated as follows. The 0 dBm input power converts to 1 mW. For an input power of 1 mW and output current of 2 mA, M equals 1.58. The technician may determine the bias voltage levels at different temperatures that produce a gain value of 1.58. The technician may associate the 1.2 Gbps AE transport standard with the different bias voltage levels at different temperatures that produce the gain value of 1.58. The technician may store the bias voltage levels and temperature values that produce the gain value of 1.58 in memory 40. In accordance with this disclosure, controller 38 may select and apply one of the bias voltage levels stored in memory 40, based on the ambient temperature, that is associated with the 1.2 Gbps AE standard when optical transport system 10A is configured for the 1.2 Gbps AE standard. In this manner, controller 38 selects and applies the bias voltage level to photodiode 44, for a given ambient temperature, such that the gain characteristic of photodiode 44 is 1.58. If the gain characteristic of photodiode 44 and the input power level is 0 dBm in accordance with 1.2 Gbps AE standard, then photodiode 44 may generate approximately 2 mA, which is less than or equal the maximum current level of TIA 42. Accordingly, optical receiver 34 may not experience an overload condition because TIA 42 is capable of functioning properly when photodiode 44 receives 0 dBm of optical power and the optical transport standard is the 1.2 Gbps AE standard. The technician may perform similar steps to calculate the desired bias voltage levels to avoid the overload condition for the various optical transport standards, such as 1.2 Gbps GPON and 2.4 Gbps GPON.

The following is description of a second example technique to determine the appropriate bias voltage that should be applied to photodiode 44 for different optical transports. The second example technique may be implemented by an engineer, a technician, or a computing device executing software. For ease of description, the technique is described as being implemented by a technician. As described above, the technician may know the maximum input current that TIA 42 can receive and still function properly. The technician may set the ambient temperature to an initial temperature. To determine the appropriate bias voltage that should be applied to photodiode 44 for a given transport standard, the technician may drive photodiode 44 with optical power level that defines the overload level for that transport standard. For example, to determine the appropriate bias voltage for the 622 Mbps BPON standard, the technician may drive photodiode 44 with −6 dBm of optical power.

Next, the technician may apply an initial voltage level to photodiode 44. The technician may then measure the current generated by photodiode 44. The technician may vary the applied voltage until the current generated by photodiode 44 is approximately equal to the maximum input current of TIA 42, e.g., 2 mA. For example, the technician may initially apply 20 V to photodiode 44. The technician may raise the voltage applied to photodiode 44 from 20 V until photodiode 44 generates approximately 2 mA. Alternatively, the technician may initially apply 50 V to photodiode 44. The technician may lower the voltage applied to photodiode 44 from 50 V until photodiode 44 generates approximately 2 mA. The technician may record the bias voltage level for the given ambient temperature that caused photodiode 44 to output 2 mA when driven by −6 dBm of optical power. The technician may associate the 622 Mbps BPON standard with the recorded bias voltage level and temperature. The technician may then store the bias voltage level and temperature level in memory 40.

The technician may keep the temperature at the initial temperature and perform similar tests on photodiode 44 for the other transport standards. For example, the technician may drive photodiode 44 with −4 dBm in accordance with the 1.2 Gbps GPON standard. Again, the technician may vary the voltage until photodiode 44 generates approximately the maximum input current level that TIA 42 can receive and still function properly. The technician may record the bias voltage level for the given ambient temperature that caused photodiode 44 to output 2 mA when driven by −4 dBm of optical power. The technician may associate the 1.2 Gbps GPON standard with the recorded bias voltage level and temperature. The technician may then store the bias voltage level and temperature level in memory 40.

After driving photodiode 44 based on the overload levels of the various optical transport standards, the technician may vary the temperature. For example, the initial ambient temperature may be −40° C. The technician may raise the temperature in increments of 1° C., as one example. The technician may then determine the appropriate bias voltage levels for each of the transport standards that generate the maximum input current level for TIA 42 utilizing the techniques described above, e.g., drive photodiode 44 with the overload level for each of the transport standards and vary the voltage until photodiode 44 generates approximately 2 mA. The technician may store in memory 40 the determined bias voltage levels for the given temperatures and transport standard.

To reiterate, the overload level of receiver 34 is a function of the current generated by photodiode 44. To avoid an overload condition, TIA 42 should be capable of functioning properly when photodiode 44 is driven with optical power at the overload level defined by the various standards. The current generated by photodiode 44 is a function of the gain characteristic, which is a function of applied bias voltage and ambient temperature. Memory 40 stores the appropriate bias voltage levels for a given ambient temperature and optical transport standard. When controller 38 applies the appropriate bias voltage level to photodiode 44 for a given temperature and optical transport standard, photodiode 44 generates electrical current that is less than or equal to the maximum input current that TIA 42 can receive and still function properly. Therefore, optical receiver 34 does not experience the overload condition if optical receiver 34 is driven in accordance with various transport standards. Accordingly, optical receiver 34 may be configurable to be compliant with the various optical transport standards.

As described above, controller 38 selects and applies the appropriate bias voltage level based on the transport standard and ambient temperature. Example techniques to determine the ambient temperature will now be described. As one example, ONT 28A may include a digital thermometer (not shown in FIG. 2). Controller 38 may detect the ambient temperature from the digital thermometer. As another example, ONT 28A may include a thermistor (not shown in FIG. 2). The resistance of the thermistor may be a function of the ambient temperature. Controller 38 may determine the resistance of the thermistor to detect the ambient temperature. Other techniques to detect the temperature may be possible as well.

The following disclosure describes techniques to determine the optical transport standard. As described above, each one of the various optical transport standards defines a maximum and minimum optical transmit and receive power. Likewise, proprietary optical transports may be characterized by maximum and minimum optical transmit and receive power levels. The maximum and minimum optical transmit and receive power levels may be considered as the physical layer requirement. As such, photodiode 44 and TIA 42 may be viewed as providing physical (PHY) layer functions, or layer 1 functions, of the OSI model, to output electrical PHY layer signals. The electrical PHY layer signals may be in the form of raw bits, e.g., zeros and ones.

As shown in FIG. 2, TIA 42 outputs to controller 38. Controller 38 may be viewed as providing data link layer functions, or layer 2 functions of the OSI model. The data link layer provides the functional and procedural means to transfer data between OES 12 or OLT 13 and ONT 28A and to detect and possibly correct errors that may occur in the physical layer. Data link layer also may include media access control (MAC) layer functionality.

Controller 38 may conform the physical layer data received from optical receiver 34 to the various optical transport standards at the MAC layer. Controller 38 may, for example, convert PHY layer signals received from optical receiver 34 to distinct data units, such as Ethernet frames, ATM cells, or other types of data units, for transmission to subscriber devices as data units, as well as convert these distinct data units received from subscriber devices to PHY layer signals for upstream transmission. Controller 38 may be configured with appropriate MAC layer functionality to conform the physical layer data in accordance with the optical transport standard. Controller 38 may be compliant with the layer 2 requirements of the various transport standards.

Controller 38 may be implemented in hardware, software, firmware, or a combination thereof. Controller 38 may be formed in part by an integrated circuit (IC). The IC may include, for example, one or more microprocessors, digital signal processors (DSPs), field-programmable gate arrays (FPGAs), application-specific integrated circuits (ASICs), application-specific standard products (ASSPs), or any combinations thereof. Controller 38 may execute the instructions stored in memory 40. As one example, different sets of instructions may be loaded for execution by controller 38 to apply different sets of MAC layer functionality, e.g., different MAC layer protocols for different optical transports such as BPON, GPON, and AE.

Controller 38 may automatically determine the optical transport standard for which optical transport system 10B (FIG. 1B) is configured, or optical transport system 10A (FIG. 1A). In some examples, controller 38 may, in effect, try each of several possible optical transport protocols until it detects an optical transport that works, i.e., an optical transport protocol for which reliable communication can be established. As one example, when optical receiver 34 is powered on, controller 38 may start-up and be randomly configured with MAC layer software or firmware for a particular optical transport standard, e.g., 2.4 Gbps GPON standard, as a starting optical transport. Upon selecting a protocol to try, controller 38 may adjust various non-optical characteristics of ONT 28, such as bit rate, preamble, packet encoding formats, and the like, as well as optical characteristics, such as photodiode bias voltage, and the like. Controller 38 may disable the laser of ONT 28A during instances where controller 38 is identifying the optical transport standard. For example, controller 38 initially may adjust non-optical characteristics by configuring itself to support MAC layer functionality associated with the 2.4 Gbps GPON standard. Controller 38 may also determine the ambient temperature at the time of start-up. Next, controller 38 may determine the appropriate bias voltage for photodiode 44 for the 2.4 Gbps GPON standard. As described above, memory 40 stores the bias voltage level that should be applied to photodiode 44 for the various combinations of transport standard and ambient temperature. Controller 38 may then select the appropriate bias voltage level from memory 40 and apply the appropriate bias voltage level for the selected transport and sensed temperature to photodiode 44, and determine whether reliable communication can be established for the transport actually used in the network in which ONT 28 is installed.

In one example, optical receiver 34 of ONT 28 may receive one or more operations, administration and maintenance (OAM) units from OES 12 or OLT 13 via optical fiber link 26 or 27. The OAM unit may be a packet, cell, frame or other data unit. In some cases, the OAM unit may be communicated as a discrete data unit, or embedded in another data unit. The OAM unit may be transmitted at a particular transfer rate, and may include indicia such as a particular preamble or data pattern. The indicia may be used by controller 38 to identify the type of optical transport standard of optical transport system 10A or 10B.

Controller 38 applies the bias voltage level for a selected transport and temperature, and appropriate MAC layer functionality, and attempts to detect OAM units transmitted according to the selected transport. If the OAM units are detected, controller 38 has successfully selected the correct transport, e.g., 2.4 Gbps GPON in this illustration. As an example, different MAC layer functionality may be selected by loading different MAC layer processing software or firmware modules for execution by controller 38. In some examples, different transports may be selected by reprogramming MAC layer firmware, such as FPGA logic, with MAC layer firmware corresponding to a desired transport, and then resetting the ONT to execute the newly reprogrammed firmware. The MAC layer firmware and/or software may specify packet structure and other parameters associated with the data transmitted and received using a particular optical transport.

If the OAM units are not detected using the initially selected photodiode bias voltage and MAC layer functionality, controller 38 tries another type of transport, such as 1.2 Gbps GPON, 622 MHz BPON, or 1.2 Gbps AE. To load a MAC layer software or firmware configured for different optical transport standards, controller 38 may refer to a control register that identifies the next MAC layer to be tested, such that each time it switches MAC layers controller 38 knows where to find the next one or which one to use. The control register may be preprogrammed with a specific order of optical transport standards that controller 38 should try. For example, the control register may indicate that the 2.4 Gbps GPON standard should be checked first, followed by the 1.2 Gbps GPON standard, followed by the 1.2 AE GPON standard, followed by the 622 Mbps BPON standard, and finally any other proprietary standards.

For each transport, controller 38 selects from memory 40 and applies an appropriate bias voltage, given the transport type and temperature, as well as appropriate MAC layer functionality. After establishing that the photodiode is receiving optical power, controller 38 continues to test different transports, until the controller properly detects an applicable OAM unit. At this point, controller 38 may identify the pertinent transport as the transport associated with the MAC layer and bias voltage that was applied. Thereafter, controller 38 may maintain the MAC layer functionality appropriate for the identified transport, and apply the appropriate bias voltage, subject to adjustments for sensed temperature variation. For example, if the 1.2 Gbps AE transport was successfully detected, then controller 38 may thereafter apply the bias voltage and MAC layer functionality appropriate for the 1.2 Gbps AE transport.

Notably, when controller 38 is loading different MAC layer processing software and/or firmware modules to identify the optical transport standard, controller 38 may disable the laser of ONT 28. In this manner, ONT 28 may not transmit any data when controller 38 is determining the optical transport standard.

The various packet structures and parameters that controller 38 may use to identify the optical transport standard will now be described. As described above, controller 38 may load MAC layer software and/or firmware for a particular optical transport standard. The MAC layer software and/or firmware may expect to receive certain packet structures at different data rates.

In one example, controller 38 may load MAC layer software and/or firmware for the BPON standard. Upon configuration, controller 38 may expect to receive data at approximately 622 Mbps. Additionally, controller 38 may expect to receive scrambled downstream data and unscrambled downstream data from OLT 13 at approximately 622 Mbps. OLT 13 may scramble voice, video, and data information and a 32 bit cyclical redundancy check (CRC) stream to generate the scrambled data. OLT 13 may add to the scrambled data some unscrambled bits. The unscrambled bits may be considered as OAM units.

If OLT 13 transmits the scrambled and unscrambled data in accordance with the BPON standard, e.g., transmits at 622 Mbps, upon receiving the scrambled downstream, controller 38 descrambles the scrambled downstream data. In the descrambled stream, there may be many random locations where groups of bits in the descrambled stream match exactly with the unscrambled data. Controller 38 may evaluate the descrambled stream to find locations where groups of bits in the descrambled stream match exactly with the unscrambled data. If controller 38 finds such matches, controller 38 may determine that the received data is synchronized and identify the optical transport standard as the BPON standard.

However, if the optical transport standard is not the BPON standard, then OLT 13 may not transmit the data that controller 38 is expecting. For example, OLT 13 may not transmit unscrambled data and scrambled data. Or OLT 13 may not transmit the unscrambled data and scrambled data at 622 Mbps. If the optical transport standard is not the BPON standard, because OLT 13 transmitted data that controller 38 is not expecting, controller 38 may not be capable of processing the data. For example, controller 38 may not be capable of descrambling data, or evaluating the data to determine whether there are groups of bits that match the unscrambled data.

In these examples, because controller 38 may not be capable of processing the data, or because controller 38 may determine that the received data was not transmitted at approximately 622 Mbps, controller 38 may conclude that the optical transport standard is not the BPON standard. In this example, the photodiode received optical signal, however, the optical signal did not conform to the BPON standard. Next, controller 38 may load the MAC layer software and/or firmware that is configured for a different optical transport standard that has yet to be tested, e.g., one of 1.2 Gbps GPON, 2.4 Gbps GPON, or 1.2 Gbps AE.

In one example, controller 38 may load MAC layer software and/or firmware for the GPON standard, i.e., either the 1.2 Gbps GPON standard or the 2.4 Gbps GPON standard. Upon configuration, controller 38 may expect to receive data at approximately 1.2 Gbps or 2.4 Gbps based on the selected standard. Additionally, controller 38 may expect to receive a start of frame delimiter value as a preamble to every frame. The start of frame delimiter value may be considered as OAM units. One example of the start of frame delimiter value is a hex value B6AB31E0. Controller 38 may expect to receive the start of frame delimiter value from OLT 13 at approximately 1.2 Gbps or 2.4 Gbps, based on the MAC layer software and/or firmware loaded on controller 38. In one example, OLT 13 may transmit the start of frame delimiter value at time-intervals of 125 micro-seconds. If OLT 13 transmits the start of frame delimiter value in accordance with the GPON standard, upon receiving the start of frame delimiter value at the appropriate data rate and during the appropriate time-intervals, controller 38 may identify the optical transport standard as the GPON standard.

However, if the optical transport standard is not the GPON standard, then OLT 13 may not transmit the start of frame delimiter value that controller 38 is expecting. For example, OLT 13 may not transmit the start of frame delimiter value. Or OLT 13 may not transmit the start of frame delimiter value at 1.2 Gbps or 2.4 Gbps. If the optical transport standard is not the GPON standard, because OLT 13 transmitted data that controller 38 is not expecting, controller 38 may not be capable of processing the data. For example, controller 38 may be waiting on the start of frame delimiter value that controller 38 never receives. Controller 38 may conclude that the optical transport standard is not the GPON standard. Again, in this example, the photodiode received optical signals, however, the optical signals did not conform to the GPON standard. Next, controller 38 may load the MAC layer software and/or firmware that is configured for a different optical transport standard that has yet to be tested, e.g., one of 1.2 Gbps AE or 622 Mbps BPON.

In one example, controller 38 may load MAC layer software and/or firmware for the 1.2 Gbps AE standard. Upon configuration, controller 38 may expect to receive data at approximately 1.2 Gbps. Additionally, controller 38 may expect to receive a particular K-character sequence that is 8B10B encoded. The K-character sequence may be reserved for control purposes only. The K-character sequence may be considered as OAM units. Controller 38 may expect to receive the K-character sequence from OES 12 at approximately 1.2 Gbps. In one example, OES 12 may transmit the K-character sequence only during the time when controller 38 is identifying the appropriate optical transport standard. If OES 12 transmits the K-character sequence in accordance with the GPON standard, i.e., at 1.2 Gbps and 8B10B encoded, upon receiving the K-character sequence at the appropriate data rate and in the appropriate encoding, controller 38 may identify the optical transport standard as the AE standard.

However, if the optical transport standard is not the AE standard, then OES 12 may not transmit the K-character sequence that controller 38 is expecting. For example, OES 12 may not transmit the K-character sequence. Or OES 12 may not transmit the K-character sequence at 1.2 Gbps. Or OES 12 may not transmit the K-character sequence that is encoded for 8B10B. If the optical transport standard is not the AE standard, because OES 12 transmitted data that controller 38 is not expecting, controller 38 may not be capable of processing the data. For example, controller 38 may be waiting on the K-character sequence that controller 38 never receives. Controller 38 may conclude that the optical transport standard is not the AE standard. Again, the photodiode received optical signals but the signal did not conform to the AE standard. Next, controller 38 may load the MAC layer software and/or firmware that is configured for a different optical transport standard that has yet to be tested, e.g., one of 1.2 Gbps GPON, 2.4 Gbps GPON, or 622 Mbps BPON.

As described, controller 38 may check the transfer rate, preamble, and packet encoding technique to determine whether the OAM unit conforms to a particular standard. However, in some examples, controller 38 may only check one or more of the OAM unit parameters but not necessarily all of the OAM unit parameters. In each case, the various parameters may be checked, in effect, by loading a particular MAC layer, e.g., by reprogramming software or firmware, and determining whether the OAM units can be intelligibly detected.

If a detected OAM unit conforms to the transfer requirements of the standard for which controller 38 is initially configured, then controller 38 determines that the optical transport system is configured for the same standard for which controller 38 and optical receiver 34 are configured. In some examples, controller 38 may transmit a confirmation signal back to OES 12 or OLT 13, based on the optical transport system, indicating that controller 38 and optical receiver 34 are configured for the correct transport standard. Controller 38 transmits the confirmation signal via optical transmitter 32.

To reiterate, however, when optical signal is present and if the OAM unit for the standard for which controller 38 is configured cannot be intelligibly detected, controller 38 configures itself for a different optical transport standard. For example, controller 38 may be initially configured for the 2.4 Gbps GPON standard and may then configure itself for the 1.2 Gbps AE standard. Controller 38 may then set the bias voltage applied to photodiode 44 based on the bias voltage level stored in memory 40. Again, memory 40 stores the bias voltage level that should be applied to photodiode 44 for the various optical transport standards. Controller 38 may then attempt to receive an OAM unit and thereby determine whether the OAM unit conforms to the transfer requirements of the particular standard for which controller 38 is configured.

Controller 38 repeats the steps of setting the appropriate bias voltage for photodiode 44, attempting to communicate signals according to different transport standards, and configuring itself for different transport standards if communication is unsuccessful. Controller 38 may keep repeating these steps until controller 38 determines that controller 38 and optical receiver 34 are configured for the appropriate optical transport standard of optical transport system 10A or 10B. In this manner, controller 38 can configure optical receiver 34 to be compliant with the various optical transport standards.

The technique utilized by controller 38 to determine the correct optical transport standard of optical transport system 10A or 10B is provided for illustration purposes only. Other techniques to determine the optical transport standard of optical transport system 10A or 10B may be applied. As one example, a technician installing ONT 28A may manually configure controller 38 for a particular optical transport standard and test ONT 28A to determine whether ONT 28A is capable of properly receiving information. If ONT 28A cannot properly receive information, the technician may manually change the configuration of controller 38 until ONT 28A properly receives information. Again, for each change in the configuration of controller 38, controller 38 determines the appropriate bias voltage that should be applied to photodiode 44 for a given detected temperature. As the technician changes the configuration of controller 38 to the various transport standards, controller 38 sets the appropriate bias voltage applied to photodiode 44 based on the transport standard for which controller 38 is configured.

As another example, prior to installing ONT 28A, the technician may ascertain the optical transport standard of the optical transport system. The technician may preprogram controller 38 so that controller 38 and optical receiver 34 are configured for the same transport standard, i.e., the correct transport standard, for which the optical transport system is configured. In this case, the photodiode bias voltage may be set manually by the technician, e.g., by a command, configuration setting or software download, or automatically upon detection of the selected optical transport by controller 38.

OES 12 and OLT 13 may comprise substantially similar components as ONT 28A. However, the photodiode within the optical receivers of OES 12 and OLT 13 may be configured to receive optical signals with different wavelengths than the wavelengths of signals received by ONT 28A. In some examples, the photodiode in OES 12 and OLT 13 may be configured to receive optical signals at wavelengths centered at approximately 1310 nm. Furthermore, the controllers within OES 12 and OLT 13 may not need to determine the optical transport standard of optical transport system 10A and 10B as described above. Rather, the CO that provides data to OES 12 or OLT 13 determines the optical transport standard of optical transport system. Accordingly, the controllers within OES 12 and OLT 13 may determine the optical transport standard based on a signal provided by the CO. The controller within OES 12 and OLT 13 sets the appropriate bias voltage for the photodiodes in accordance with the optical transport standard of optical transport system. Accordingly, the optical receivers within OES 12 and OLT 13 may be configured to be compliant with the various optical transport standards.

FIG. 3 is a graph illustrating the relationship between the gain characteristics of an example photodiode 44 and the applied bias voltage and ambient temperature. The graph shown in FIG. 3 is generated by driving photodiode 44 with 2 micro-watts of optical power. Photodiode 44 is an APD and is manufactured to receive optical signals centered at wavelengths of approximately 1550 nm. In the graph of FIG. 3, photodiode 44 may be a photodiode generated by Eudyna Devices Inc.

As seen in FIG. 3, the gain values of photodiode 44 are a function of the applied bias voltage and ambient temperature, i.e., the gain characteristics. Generally, at a given temperature level, high bias voltages result in high gain values. Also, at a given bias voltage level, low ambient temperatures result in high gain values. Simply put, the gain of photodiode 44 is inversely proportional to the temperature and proportional to the applied bias voltage.

In one example, to configure optical receiver 34 to be compliant with the 2.4 Gbps GPON standard, controller 38 may apply a bias voltage level of approximately 45 V on photodiode 44 when the ambient temperature is approximately 25° C. As seen in FIG. 3, the gain value (M) is approximately 10 when controller 38 applies 45 V on photodiode 44 and the ambient temperature is approximately 25° C. In this example, the overload level of optical receiver 34 is approximately −8 dBm in accordance with the 2.4 Gbps GPON standard.

To configure optical receiver 34 to be compliant with the 1.2 Gbps AE standard, the overload level needs to increase from −8 dBm to 0 dBm. To increase the overload level, the gain value needs to decrease because photodiode 44 may need to generate approximately the same amount of current if driven by −8 dBm or 0 dBm. Photodiode 44 generates approximately 1.42 mA when driven by −8 dBm and M equals 10. The current value can be calculated based on equations (1) and (2). The gain value (M) when photodiode is driven by 0 dBm and the desired output current is 1.42 mA is approximately 1.58. Again, the gain value can be calculated based on equations 1 and 2. As seen in FIG. 3, to achieve a gain value of 1.58, the applied bias voltage equals approximately 19 V when the ambient temperature is approximately 25° C.

By decreasing the gain value from 10 to 1.58 the current generated by photodiode 44 decreases by a factor of approximately 6.33, i.e., 10 divided 1.58. Ten multiplied by the logarithm of 6.33 is approximately 8 dB, i.e., 10*log(6.33) equals approximately 8. Therefore, by decreasing the gain value from 10 to 1.58, the overload level increases from −8 dBm to 0 dBm.

In this example, if the transport system standard is the 2.4 Gbps GPON standard, the ambient temperature is approximately 25° C., and controller 38 applies approximately 45 V to photodiode 44, optical receiver 34 may not experience an overload condition. As noted above, optical receiver 34 may already function properly when driven by the minimum input optical power defined by the 2.4 Gbps GPON standard, e.g., sensitivity level. Accordingly, optical receiver 34 may be compliant with the 2.4 Gbps GPON standard. Similarly, if the transport system standard is the 1.2 Gbps AE standard, the ambient temperature is approximately 25° C., and controller 38 applies approximately 19 V to photodiode 44, optical receiver 34 may not experience an overload condition. Again, optical receiver 34 may already function properly when driven by the minimum input optical power defined by the 1.2 Gbps AE standard. Accordingly, optical receiver 34 may be compliant with the 1.2 Gbps AE standard.

As described above, the gain of photodiode 44 is a function of the applied bias voltage. Furthermore, the bandwidth of photodiode 44 may also be a function of the gain characteristic. Since the gain is a function of the applied bias voltage, the bandwidth of photodiode 44 may also be a function of the applied bias voltage. The bandwidth may refer to the maximum signal rate at which photodiode 44 is able to reliably reproduce distinct signals, such as logical 1's and 0's, e.g., in terms of producing a sufficient gain and resulting amplitude.

Figure 4:
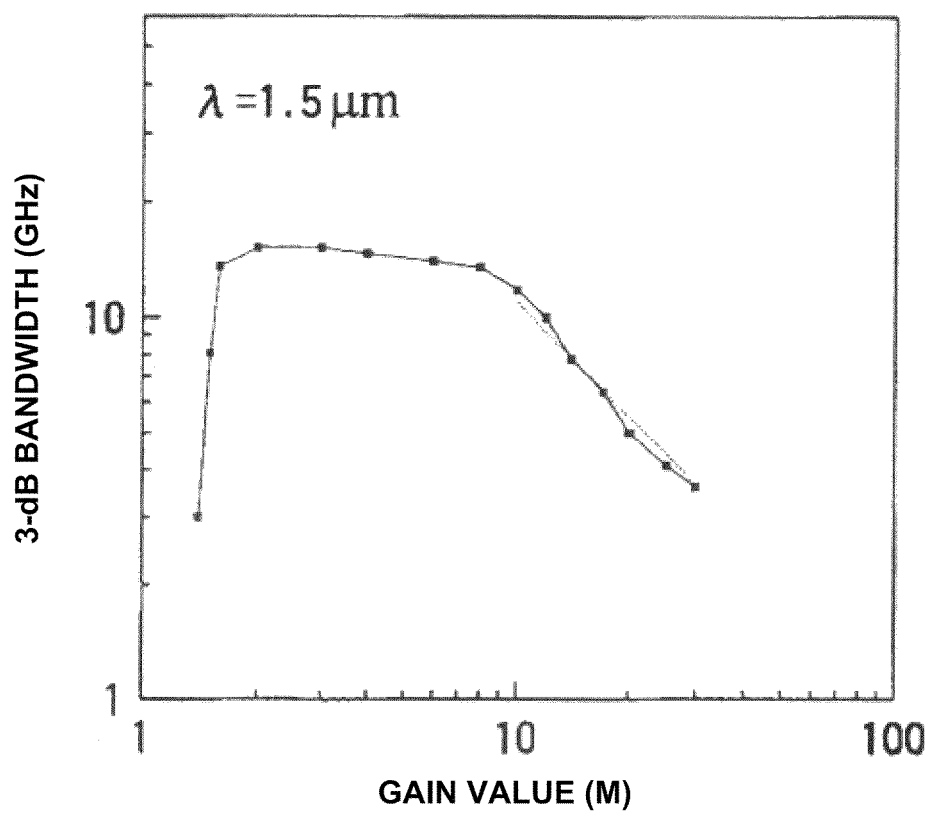
FIG. 4 is a graph illustrating a relationship between 3-dB bandwidth and gain for the photodiode.

FIG. 4 is a graph illustrating a relationship between the 3-dB bandwidth of photodiode 44 and the gain value. In FIG. 4, the x-axis and y-axis, i.e., the gain value and 3-dB bandwidth value, respectively, are shown in a logarithmic scale. The 3-dB bandwidth of photodiode 44 may be interpreted to mean that at the 3-dB bandwidth value, the gain of photodiode 44 decreased by 3 dB. Photodiode 44 is an APD in the example of FIG. 4, and is manufactured to receive 1550 nm wavelength optical signals. As shown in FIG. 4, for a relatively low gain value (M), e.g., M equals approximately 1.5, the 3-dB bandwidth of photodiode 44 is relatively low, e.g., 3 GHz. The bandwidth of photodiode 44 increases as the gain value increases. Between a gain value of approximately 1.5 and 2, the 3-dB bandwidth sharply increases. When the gain value is greater than approximately 2 and less than 10, the 3-dB bandwidth gradually decreases from approximately 11 GHz to 10 GHz. When the gain value is greater than approximately 10 and less than 30, the 3-dB bandwidth drastically decreases from approximately 10 GHz to 3 GHz.

Generally, in some examples, the bandwidth of photodiode 44 may be approximately 75% of the transfer rate, e.g., 75% of 2.4 Gbps, 1.2 Gbps, or 622 Mbps based on the optical transport standard. As described above, the bandwidth of TIA 42 may be equal to approximately 2.4 Gbps so that TIA 42 may function properly for the multiple optical standards. In other words, TIA 42 functions properly if the transfer rate is less than or equal to 2.4 Gbps. Furthermore, as described above, for optical receiver 34 to be compliant with the 2.4 Gbps GPON standard and the 1.2 Gbps AE standard, the gain value may need to be decreased. Because the transfer rate of the AE standard is less than the transfer rate of the 2.4 Gbps GPON standard, the reduction in bandwidth due to the reduction in gain value may be acceptable.

The relationship between the bandwidth of photodiode 44 and the gain value shown in FIG. 4 is just one example. Different photodiodes may exhibit different relationships between the bandwidth and the gain value. Although optical receiver 34 may be capable of properly functioning when driven by the minimum input power defined by the various standards, a reduction in the gain of photodiode 44 may affect the sensitivity of optical receiver 34. Accordingly, in some implementations, care should be taken to select a proper photodiode 44 so that optical receiver 34 conforms to both the overload level and the sensitivity level defined by the various standards.

To support adaptive configuration of photodiode 44 for compliance with different optical transports, memory 40 may store bias voltages that controller 38 should apply to photodiode 44 for given optical transport standards and ambient temperatures. Again, memory 40 may be both static memory (e.g., FLASH memory, EPROM, EEPROM, etc.) and dynamic memory (e.g., RAM, DRAM, SRAM, etc.), or any other computer-readable storage medium capable of storing instructions that cause the one or more processors to perform the techniques described in this disclosure. The bias voltages stored in memory 40 are control data that controller 38 reads to determine the amount of bias voltage should be applied to photodiode 44. In addition to the bias voltage levels, memory 40 also comprises instructions that cause controller 38 to perform various functions.

A range of bias voltages may be provided and stored for each type of transport and for a range of temperatures, e.g., ranging over several temperatures within a range of −40 degrees C. to 85 degrees C. The bias voltages may be stored in a variety of formats, such as lists, arrays, tables or other data structures, and may form control data for use by controller 38 in applying the techniques described in this disclosure. As described above, a technician may record and store in memory 40 the bias voltages that controller 38 should apply for a transport standard and ambient temperature.

At startup, the instructions in memory 40 may cause controller 38 to perform various functions to apply the control data. For example, instructions may cause controller 38 to configure itself for a particular transport standard, e.g., the 2.4 Gbps GPON standard, by loading suitable MAC layer software for execution by controller 38 as explained above. In some examples, the software may be loaded from memory 40 or another memory or storage device into RAM accessed by controller 38. The instructions may then cause controller 38 to determine the ambient temperature. Next, the instructions may cause controller 38 to apply the control data, e.g., appropriate bias voltages, to photodiode 44 based on the determined optical transport and determined ambient temperature. For example, if controller 38 is configured for the 2.4 Gbps GPON standard and controller 38 determined that the ambient temperature is −40° C., the instructions may cause controller 38 to select and apply the bias voltage associated with the 2.4 Gbps GPON standard and ambient temperature of −40° C.

The instructions may then cause controller 38 to determine whether a test signal, i.e., OAM units, received from OLT 13 conforms to the 2.4 Gbps GPON standard. If the OAM units conform to the 2.4 Gbps GPON standard, in some examples, the instructions may cause controller 38 to transmit a signal to OLT 13, indicating that optical receiver 34 is compliant with the 2.4 Gbps GPON standard. If the OAM units do not conform to the 2.4 Gbps GPON standard, the instructions may cause controller 38 to configure itself for a different optical transport and apply the appropriate bias voltage to photodiode 44 stored in memory 40. The instructions may cause controller 38 to change its configuration until controller 38 is configured for the appropriate transport, i.e., the OAM units transmitted by OLT 13 can reliably detected by controller 38.

In some examples, after controller 38 conforms to the same optical transport standard as optical transport system 10A or 10B, the instructions may cause controller 38 to periodically determine the ambient temperature. If the ambient temperature changes, instructions may cause controller 38 to apply the appropriate bias voltage to photodiode 44 based on the newly determined ambient temperature. Essentially, the instructions may cause controller 38 to determine an optical transport standard of the optical transport system, and configure optical receiver 34 to conform to the overload level defined by the optical transport standard.

Figure 5:
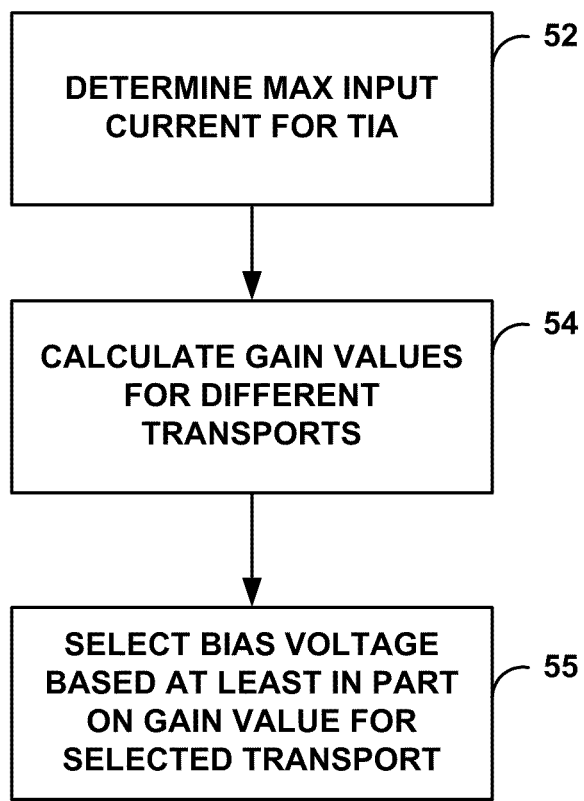
FIG. 5 is a flowchart illustrating an example method for determining appropriate photodiode gain values to support various transport standards.

FIG. 5 is a flowchart illustrating an example method for determining the appropriate gain value of photodiode 44 for the various transport standards. The steps illustrated in FIG. 5 may be implemented manually or semi-automatically by a technician or automatically using software. Initially, a technician may determine the maximum input current level that TIA 42 can receive and still function properly (52). The maximum input current level that TIA 42 can receive may be provided by the manufacturer of TIA 42. In some examples, the technician may provide the maximum input current level that TIA 42 can receive to a software program. The technician or a processor executing the software may then calculate the gain value of photodiode 44 (M) for the various transports based on the overload level defined by the various transports and the maximum input current level that TIA 42 can receive (54). For example, the technician or a processor executing software may utilize equations (1) and (2) given above to calculate the gain value of photodiode 44 for the various transports.

For example, assume the maximum input current level that TIA 42 is 2 mA. The overload level for the 1.2 Gbps AE standard is 0 dBm. The 0 dBm input optical power may be converted to watts based on equation 2. The 0 dBm input optical power converts to 1 mW. The technician or software may utilize equation 1 to calculate the gain value of photodiode 44 if photodiode 44 is driven by 0 dBm input optical power. Equation 1 simplifies to $M=I_{out}/(R_o*P_{in})$. In this example, $I_{out}$ equals 2 mA, $R_o$ equals 0.9, and $P_{in}$ equals 1 mW. Therefore, the gain value (M) is approximately equal to 2.2. Accordingly, if the optical transport system is configured for the 1.2 Gbps AE standard, the gain of photodiode 44 should be approximately 2.2. The technician or software may implement similar techniques to calculate the gain value of photodiode 44 for the other transport standards. The technician or software may record the desired gain values for the various transport standards. Using the calculated gain values, a technician or processor executing software may select a bias voltage for a selected transport. In particular, the bias voltage may be selected based at least in part on the gain value for the selected transport (55). Again, the bias voltage also may be selected at least in part based on ambient temperature. Accordingly, a plurality of bias voltages for a given transport may be determined and stored for multiple temperature levels.

Figure 6:
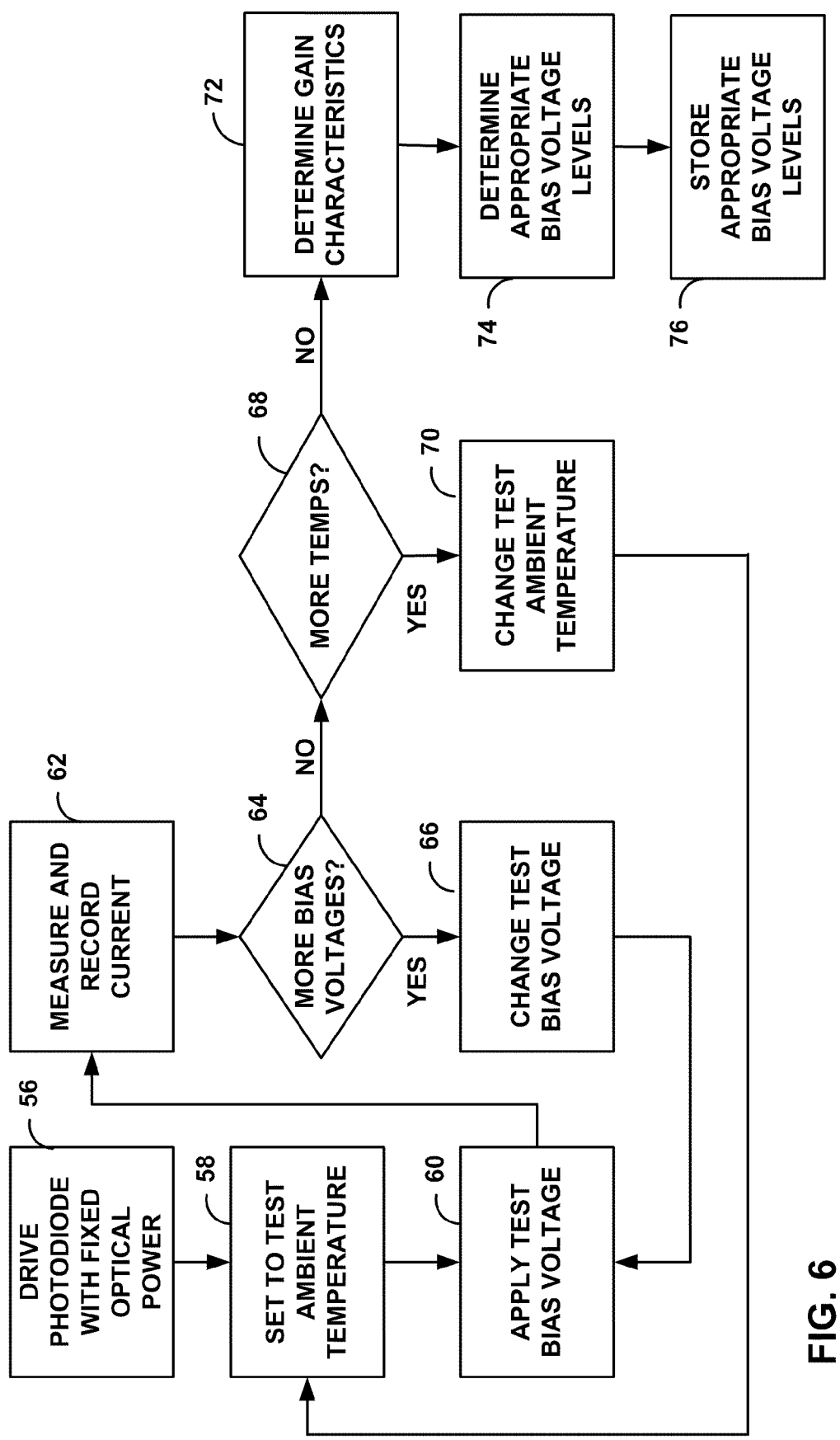
FIG. 6 is a flowchart illustrating an example method for determining an appropriate bias voltage for a photodiode given a transport standard and ambient temperature.

FIG. 6 is a flowchart of a first example method for determining the bias voltage that should be applied to photodiode 44 given a transport standard and ambient temperature. The steps described with respect to FIG. 5 may need to be performed before the steps described with respect to FIG. 6. Again, a technician or a processor executing software may implement the steps shown in FIG. 6. For clarity, the steps shown in FIG. 6 are described as being implemented by a technician.

Initially, the technician selects a fixed optical power level and causes a controller to drive photodiode 44 with a fixed input optical power level, e.g., 2 micro-watts (μW) (56). The technician then sets the ambient temperature to a test ambient temperature, e.g., minus 40° C. (58). The technician then applies a test bias voltage to photodiode 44, e.g., 20 V (60). The technician measures and records the current generated by photodiode 44 (62).

The technician then determines whether there are more bias voltages that should be tested (64). If there are additional bias voltages that should be tested (YES of 64), the technician changes the test bias voltage (66), applies the test bias voltage to photodiode 44, and measures and records the current generated by photodiode 44. The technician may repeat changing the test bias voltage, applying the test bias voltage, and measuring and recording the current generated by photodiode 44 until all bias voltage levels have been applied to photodiode 44. In some examples, the test bias voltage level ranges from 20 V to 50 V.

If there are no additional bias voltages that should tested (NO of 64), the technician determines whether there are additional ambient temperature levels that should be tested (68). If there are additional ambient temperature levels that should be tested (YES of 68), the technician changes the test ambient temperature level (70). The technician measures and records the current generated by photodiode 44 over the range of test bias voltage levels for each ambient temperature level. In some examples, the test ambient temperature level ranges from −40° C. to 85° C.

If there are no additional ambient temperature levels that should be tested (NO of 68), the technician determines the gain characteristic of photodiode 44 as a function of the applied bias voltage and ambient temperature (72). The gain characteristic of photodiode 44 may be calculated based on equation (1). Again, the gain value (M) equals $I_{out}/(R_o*P_{in})$. In this example, $R_o$ equals 0.9 and $P_{in}$ equals 2 micro-watts. $I_{out}$ is recorded by technician as a function of applied bias voltage and ambient temperature as described with respect to step 62. Therefore, the technician may calculate the gain characteristic of photodiode 44, i.e., the gain value of photodiode 44 as a function of applied bias voltage and ambient temperature.

At this point, the technician knows the gain characteristic of photodiode 44 and, as described with respect to FIG. 5, the desired gain values of photodiode 44 for the various transport standards. The technician may then determine the appropriate bias voltage levels that produce the desired gain values of photodiode 44 for a given ambient temperature for each of the various transport standards (74). For example, as described with respect to FIG. 5, in one example, the desired gain value of photodiode 44 may be 2.2 if optical transport system 10A is configured for the 1.2 Gbps AE standard. The technician may determine the appropriate bias voltages for each ambient temperature level that produces a gain value of 2.2. The technician may perform similar steps for each of the various transport standards. Next, the technician stores the appropriate bias voltage levels for each ambient temperature level and for each transport standard in memory 40 as control data (76).

Figure 7:
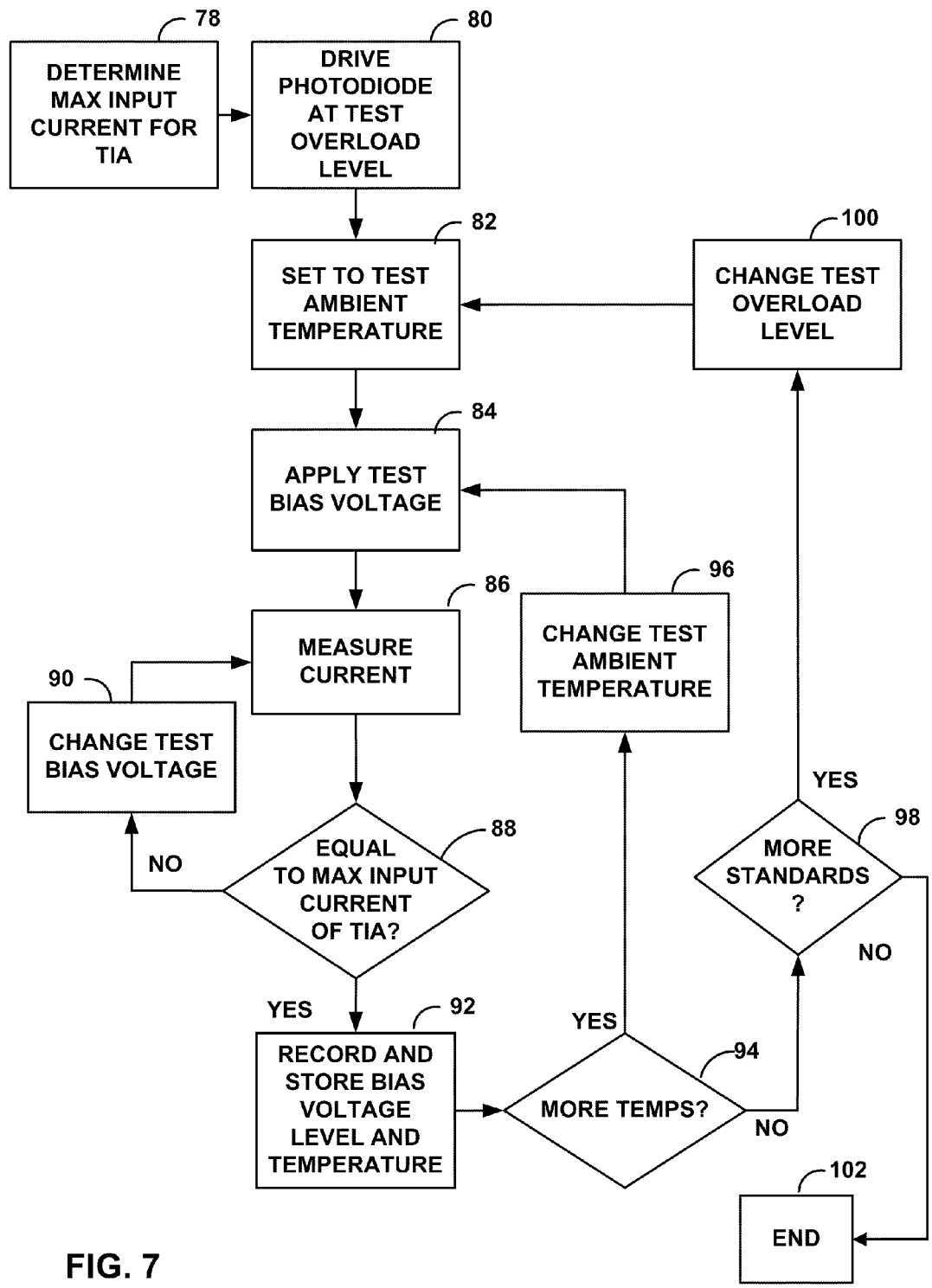
FIG. 7 is a flowchart illustrating another example method for determining an appropriate bias voltage for a photodiode given a transport standard and ambient temperature.

FIG. 7 is a flowchart illustrating a second example method for determining the bias voltage that should be applied to photodiode 44 given a transport standard and ambient temperature. Again, a technician or software executed by a processor may implement the steps shown in FIG. 7. For clarity, the steps shown in FIG. 7 are described as being implemented by a technician.

Initially, a technician may determine the maximum input current level that TIA 42 can receive and still function properly (78). The manufacturer of TIA 42 may provide the maximum input current level that TIA 42 can receive and still function properly. Next, the technician drives photodiode 44 at a test overload level (80). The test overload level may be the overload level defined by at least one of the various transport standards. For example, the technician may drive photodiode 44 with an optical signal at a power level of −6 dBm in accordance with the 622 Mbps BPON standard.

The technician then sets the ambient temperature to a test ambient temperature (82). The technician then applies a test bias voltage level to photodiode 44 (84). The technician measures the current generated by photodiode 44 (86).

The technician then determines whether the current generated by photodiode 44 is approximately equal to but not greater than the maximum input current level of TIA 42 (88). If the current generated by photodiode 44 is not approximately equal to the maximum input current level of TIA 42 (NO OF 88), the technician changes the bias voltage level (90), applies the test bias voltage to photodiode 44, and determines whether the current generated by photodiode 44 is approximately equal to but not greater than the maximum input current level of TIA 42. In some examples, the range of the bias voltage is 20 V to 50 V. The technician may repeat changing the bias voltage level until the current generated by photodiode 44 is approximately equal to but not greater than the maximum input current level of TIA 42.

If the current generated by photodiode 44 is approximately equal to but not greater than the maximum input current level of TIA 42 (YES of 88), the technician records and stores in memory 40 the bias voltage level and the ambient temperature (92). Next, the technician determines whether there are additional ambient temperatures that should be tested (94). If there are additional ambient temperatures that should be tested (YES of 94), the technician changes the test ambient temperature (96) and applies the range of bias voltage levels until the current generated by photodiode 44 is approximately equal to but not greater than the maximum input current of TIA 42. In some examples, the ambient temperatures range from −40° C. to 85° C. The technician repeats changing the ambient temperature and applying the range of bias voltage levels until all the ambient temperature levels have been tested.

If there are no additional ambient temperature that should be tested (NO of 94), the technician determines whether there are additional transport standards that should be tested (98). If there are additional transport standards that should be tested (YES of 98), the technician drives photodiode 44 at a different overload level (100). The overload level may be the overload level defined by a different one of the various transport standards. For example, the technician may initially drive photodiode 44 with −6 dBm in accordance with the 622 Mbps BPON standard, and then drive photodiode 44 with −4 dBm in accordance with the 1.2 Gbps GPON standard.

The technician may then change the temperature and the bias voltage levels until photodiode 44 has been driven at the overload level defined by all of the various transport standards of interest. The technician stops when there are no additional transport standards that should be tested (NO of 98) (102).

Figure 8:
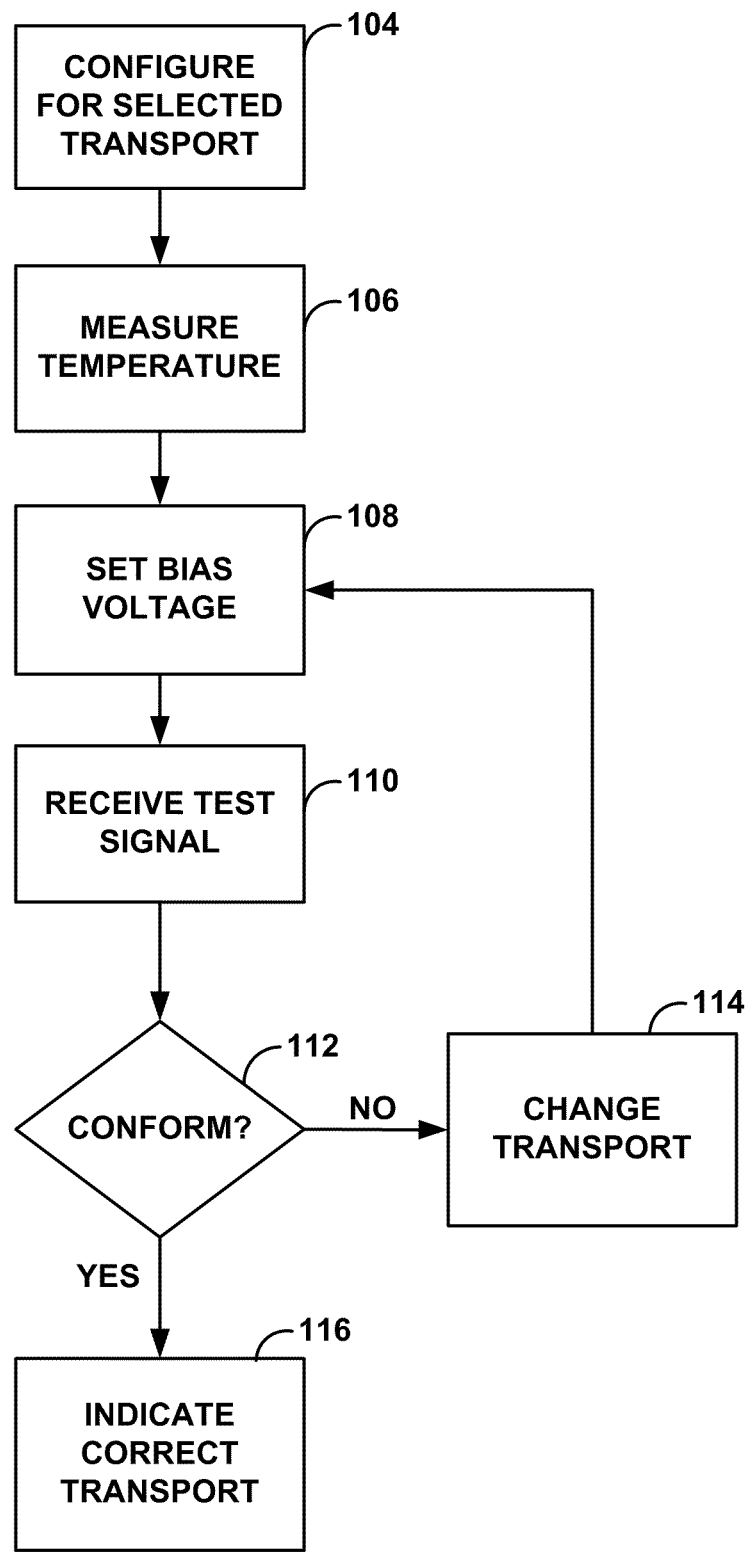
FIG. 8 is a flowchart illustrating an example method for determining an optical transport standard used by an optical transport system.

FIG. 8 is a flowchart illustrating an example method of identifying the optical transport selected for optical transport system 10A or 10B. Controller 38 initially conforms itself to a particular standard, e.g., 2.4 Gbps GPON standard (104). When controller 38 conforms itself to a particular standard, controller 38 expects data in accordance with that particular standard. For example, if controller 38 conforms itself to the 2.4 Gbps GPON standard, e.g., by loading 2.4 Gbps GPON MAC firmware, controller 38 expects the received data to be packaged in accordance with the 2.4 Gbps GPON standard, e.g., in accordance with the data link layer or MAC layer.

Controller 38 may then measure the temperature (106). Controller 38 may measure the temperature in a variety of ways, e.g., from a digital thermometer or may measure the resistance of a thermistor to detect the temperature, as two non-limiting examples. Controller 38 may then apply the appropriate bias voltage to photodiode 44 stored in memory 40 based on the determined temperature and the transport for which controller 38 is configured (108). The transport may be a standard optical transport such as GPON, BPON, or AE, or may be a proprietary optical transport.

Controller 38 may then receive a test signal, e.g., OAM units, from OES 12 or OLT 13 (110). The OAM units from OES 12 or OLT 13 conforms to the transfer requirements of the transport for which optical transport system 10A or 10B is configured. The OAM units may be a particular set of data transmitted at the appropriate transmit rate. Controller 38 then determines whether the OAM units conforms to the transfer requirements of the transport for which controller 38 is configured (112). Controller 38 may determine whether one or more of the OAM units conform to the transfer requirements of the standard for which controller 38 is configured. For example, if controller 38 is configured for the BPON standard, controller 38 may determine whether it received the expected 32 bit CRC. As another example, if controller 38 is configured for the GPON standard, controller 38 may determine whether it received the expected start of frame delimiter value. As yet another example, if controller 38 is configured for the AE standard, controller 38 may determine whether it received the expected K-character sequence. In some additional examples, controller 38 may determine whether the transfer rate and preamble of the OAM units is compliant with the transport for which controller 38 is configured.

If one or more of the OAM units do not conform to the standard that controller 38 is configured for (NO of 112), controller 38 changes the transport by reconfiguring itself for a different transport which may be a standard transport or a proprietary transport, e.g., the 1.2 Gbps AE standard transport (114). For example, controller 38 may load MAC layer firmware for a different, selected transport. In addition, controller 38 may apply the appropriate bias voltage to photodiode 44 based on the selected transport and temperature. Controller 38 then receives the OAM units and determines whether the OAM units are appropriate for the transport for which controller 38 is configured. Controller 38 repeats the steps of applying the appropriate bias voltage and determining whether the OAM units conform to the standard for which controller 38 is configured until the OAM units conform to the standard for which controller 38 is configured. As shown in FIG. 8, controller 38 only measures the temperature once. In some examples, this may not be the case. Controller 38 may measure the temperature every time controller 38 configures itself for a different standard. However, the steps shown in FIG. 8 may occur rather quickly and the temperature may not change each time controller 38 configures itself for a different standard.

If one or more of the test signal parameters conforms to the standard that controller 38 is configured for (YES of 112), controller 38 may transmit a signal to OES 12 or OLT 13 indicating that controller 38 and optical receiver 34 are configured for the same optical transport for which optical transport system 10A or 10B is configured (116). In response, OES 12 or OLT 13 stops transmitting test signal and transmission and reception of voice, video, and data information may commence.

The techniques described in this disclosure may be utilized to configure optical receiver 34 to be compliant with the physical layer requirements of the various transport standards. The various transport standards define a sensitivity level and an overload level. Optical receiver 34 may be compliant with the sensitivity levels defined by the various transport, including standard transports or proprietary transports. In accordance with this disclosure, optical receiver 34 may be configured to conform to the overload levels defined by the various transports by setting the appropriate gain value of photodiode 44, i.e., applying the proper bias voltage to photodiode 44.

However, for ONTs 28 to be fully compliant with the various transports, both optical transmitter 32 and optical receiver 34 need to be compliant with the various transports.

The following discussion describes techniques that may be utilized to make optical transmitter 32 compliant with the various transports.

Figure 9:
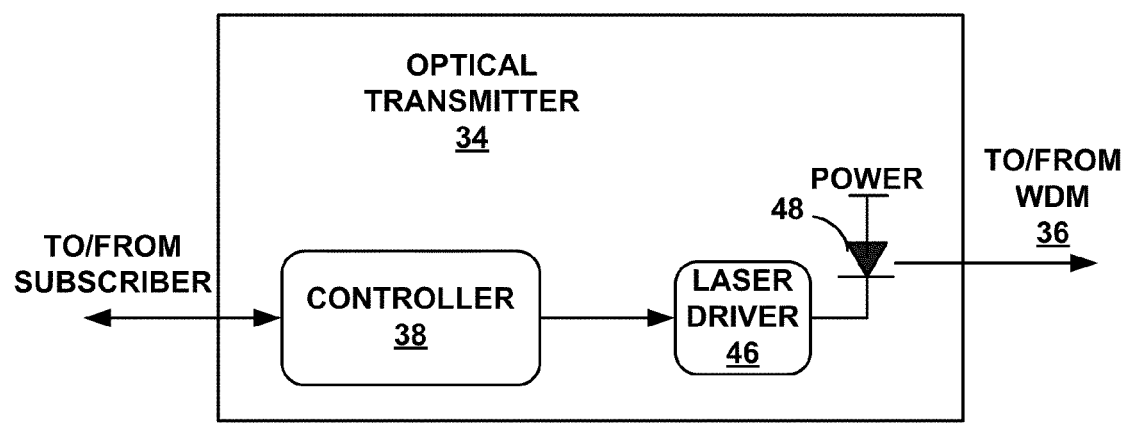
FIG. 9 is a block diagram illustrating an example optical transmitter for use in an optical networking system.

FIG. 9 is a block diagram illustrating an example optical transmitter 34. For purposes of clarity, the other blocks within ONT 28A shown in FIG. 2, are not shown in FIG. 9. Optical transmitter 34 comprises controller 38, laser driver 46, and laser 48. To transmit data, controller 38 receives upstream information, e.g., voice and data information, from the subscriber premises. Controller 38 provides the upstream information to laser driver 46. The upstream information may comprise a plurality of logic ones and logic zeros. Laser driver 46 modulates laser 48 based on the upstream information to produce the optical signal. One example of laser 48 is a distributed feedback laser (DFB). Laser 48 transmits the optical signal to WDM 36.

Laser driver 46 may cause a modulation current to flow through laser 48 when the upstream information includes a logic one and cause no modulation current to flow through laser 48 when the upstream information includes a logic zero. In addition to the modulation current, laser driver 46 causes a bias current to flow through laser 48 during the time when laser driver 46 is transmitting information. In some examples, such as burst-mode applications common with PON standards, controller 36 may cause laser driver 46 to turn off the modulation and bias currents for time intervals when controller 36 is scheduled to not transmit information. During time intervals when controller 38 is scheduled to transmit information, controller 38 may cause laser driver 46 to apply the modulation and bias currents through laser 48.

Figure 10:
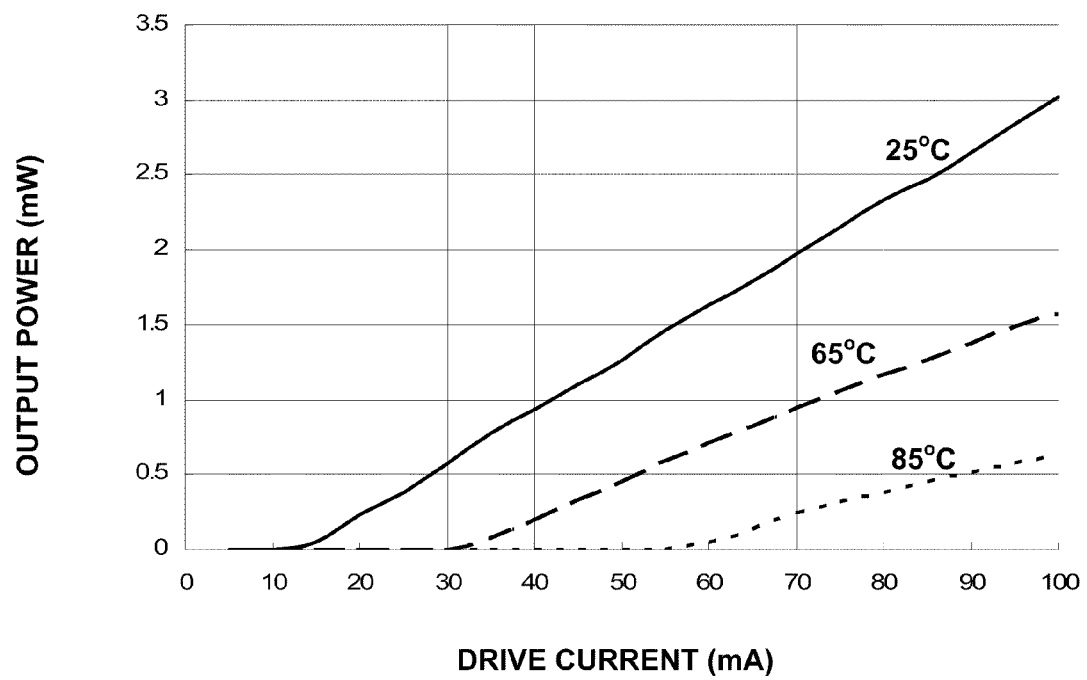
FIG. 10 is a graph illustrating a relationship between output power, drive current and ambient temperature for a laser in an optical transmitter.

The output power generated by laser 48 is a function of the modulation current, the bias current, and ambient temperature. FIG. 10 is a graph illustrating the relationship between the output power of laser 48 and the drive current and ambient temperature. As seen in FIG. 10, the output power is proportional to modulation and bias currents and inversely proportional to the temperature. In other words, the higher the modulation and bias currents the higher the output power will be, and the lower the temperature the higher the output power will be. In the graph of FIG. 10, laser 48 may be a laser generated by Luminent Inc.

The output power, current through laser 48, i.e., bias and modulation current, and temperature relationship shown in FIG. 10 may be calibrated during manufacturing. The calibration may be performed by a technician. The technician may set the ambient temperature and drive laser 48 with varying levels of drive current. For each current level, the technician may record the output optical power. Next, the technician may vary the temperature and drive laser 48 at various drive current levels. For each temperature level and drive current level, the technician may record the output optical power. In some examples, it may be assumed that any laser that is substantially similar to laser 48 exhibits the same output power, drive current, and temperature relationship shown in FIG. 10. In some examples, rather than calibrating only one laser, the technician may calibrate multiple lasers, all of the same type. The technician may then average the various output power numbers to generate an approximation of the output power, drive current, and temperature relationship for any new laser.

Furthermore, it may be assumed that the output power and drive current relationship for any temperature is approximately piecewise linear. The technician may determine the slope efficiency of laser 48, i.e., the slope that best fits the piecewise linear line, and store the slope efficiency value in memory 40 (FIG. 2). The slope efficiency value may be used to calculate the modulation current. The bias current may be the x-intercept of FIG. 10. In other words, the bias current may be the maximum current that generates approximately 100 μW, or a small non-zero value, of optical power. Generally, laser 48 requires some amount of threshold current before laser 48 outputs optical power greater than the small non-zero value. The bias current may be referred to as the threshold current. The bias current level may be stored in memory 40.

Referring back to FIG. 9, controller 38 may determine the optical transport standard of optical transport system 10A or 10B and the ambient temperature utilizing techniques described above. Next, controller 38 may determine the drive current based on the slope efficiency and the bias current level stored in memory 40 so that the optical power generated by laser 48 is between the maximum and minimum output power levels defined by the various transport standards. For example, as seen from Table 1, for the 622 Mbps BPON standard, the maximum transmit power is 4 dBm and the minimum transmit power is -2 dBm. In one example, if controller 38 determines that the optical transport standard is the 622 Mbps BPON standard, controller 38 may select the drive current such that the power generated by laser 48 is approximately 0 dBm.

A transmit power of 0 dBm is equivalent to a transmit power of 1 mW. Equation (2) provides the equation to convert dBm to watts. As seen in FIG. 10, the current to generate 1 mW of optical power is approximately 42 mA when the ambient temperature is 25° C. More specifically, the bias current is approximately 15 mA and the modulation current is approximately 27 mA for an ambient temperature of 25° C. Accordingly, the current is 42 mA, i.e., 15 mA plus 27 mA. Controller 38 may cause laser driver 46 to apply 15 mA of bias current and 27 mA of modulation current through laser 48. In this manner, the output of optical transmitter 34 is compliant with the 622 Mbps BPON standard. Controller 38 may similarly select the modulation and bias currents so that optical transmitter 34 is compliant with the various other transports, such as standard transports and/or proprietary transports.

The transmitters within OES 12 and OLT 13 may comprise substantially similar components as those shown in FIG. 9. However, the controller within the transmitters may not need to determine the optical transport standard because the CO determines the optical transport standard of optical transport system 10A or 10B. The controllers within OES 12 and OLT 13 may receive an indication of the optical transport of optical transport system 10A or 10B directly from the CO, and configure itself according to the indicated transport.

The various aspects of this disclosure provide for optical receivers and optical transmitters that are adaptively compliant with various optical transports. The optical receivers and transmitters may be part of an ONT, an OES, or an OLT. The ONT, OES, and OLT may be referred to as optical network devices.

The techniques described herein may be implemented in hardware, software, firmware, or any combination thereof. Various features described as modules, units or components may be implemented together in an integrated logic device or separately as discrete but interoperable logic devices or other hardware devices, including optical hardware components. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as RAM, SDRAM, ROM, NVRAM, EEPROM, FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be software and/or firmware executed by processing circuitry including one or more processors, such as one or more DSPs, general purpose microprocessors, ASICs, FPGAs, ASSPs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various aspects have been described in this disclosure. These and other aspects are within the scope of the following claims.

The invention claimed is:

1. A method comprising:
    determining, with a controller in an optical network terminal (ONT) as part of a start-up operation of the ONT, an optical transport of an optical network coupled to the ONT at least in part by configuring the ONT to operate with different optical transports until the controller determines that data received by the ONT conforms to one of the different optical transports for which the ONT is configured;
    selecting, with the controller, for each configuration of the ONT, a bias voltage for a photodiode of an optical receiver of the ONT and a media access control (MAC) layer functionality based on the optical transport to which the ONT is configured;
    applying, with the controller, for each configuration of the ONT, the selected bias voltage to the photodiode and the selected MAC layer functionality, wherein, when the ONT is configured to conform to the optical transport of the optical network, applying the selected bias voltage to the photodiode causes a current that the photodiode outputs, when the photodiode receives optical power at a maximum power level defined by the optical transport, to be less than or equal to a maximum current that a trans-impedance amplifier (TIA) of the optical receiver is configured to detect and receive without overloading,
    wherein the determined optical transport is one of a plurality of different optical transports, and the optical receiver is configurable to conform to maximum power levels defined by each of the plurality of different optical transports; and
    configuring, with the controller, the ONT to thereafter conform to the optical transport of the optical network to which the ONT is coupled.

2. The method of claim 1, wherein the optical transport comprises at least one of a passive optical network (PON) transport and an Active Ethernet (AE) transport, and wherein the optical receiver is configurable to conform to overload levels of both the PON transport and the AE transport.

3. The method of claim 2, wherein the PON transport comprises at least one of a 622 mega-bits per second (Mbps) baseband PON (BPON) standard transport, a 1.2 gigabits per second (Gbps) gigabit PON (GPON) standard transport, and a 2.4 Gbps GPON standard transport, and the AE transport comprises a 1.2 Gbps AE standard transport.

4. The method of claim 1, further comprising:
    detecting, in the ONT, a temperature,
    wherein selecting the bias voltage comprises selecting the bias voltage based at least in part on the optical transport to which the ONT is configured and the detected temperature.

5. The method of claim 1, wherein selecting a bias voltage comprises retrieving from memory data indicating one of a plurality of bias voltages based on the optical transport to which the ONT is configured.

6. The method of claim 5, further comprising:
    detecting a temperature; and
    retrieving from memory data indicating the one of a plurality of bias voltages based on the optical transport to which the ONT is configured and the detected temperature.

7. The method of claim 5, wherein the bias voltages indicated by the data in the memory are calculated based on a gain characteristic of the photodiode and a maximum input current level of the TIA coupled to the photodiode.

8. The method of claim 5, wherein the bias voltages indicated by the data in the memory are calculated based on a maximum input current level of the TIA coupled to the photodiode and overload levels of the plurality of different optical transports, and different temperatures.

9. The method of claim 1, wherein the maximum current that the TIA of the optical receiver is configured to detect and receive without overloading the TIA comprises a maximum current from which the TIA of the optical receiver is configured to detect logic ones and logic zeroes.

10. An optical network terminal (ONT) comprising:
    an optical receiver comprising a photodiode and a trans-impedance amplifier (TIA); and
    a controller configured to:
        determine, as part of a start-up operation of the ONT, an optical transport of an optical network coupled to the ONT at least in part by configuring the ONT to operate with different optical transports until the controller determines that data received by the ONT conforms to one of the different optical transports for which the ONT is configured,
        select, for each configuration of the ONT, a bias voltage for the photodiode and a media access control (MAC) layer functionality based on the optical transport to which the ONT is configured, and
        apply, for each configuration of the ONT, the selected bias voltage to the photodiode and the selected MAC layer functionality, wherein, when the ONT is configured to conform to the optical transport of the optical network, the selected bias voltage applied to photodiode causes a current that the photodiode outputs, when the photodiode receives optical power at a maximum power level defined by the optical transport, to be less than or equal to a maximum current that the TIA is configured to detect and receive without overloading,
    wherein the determined optical transport is one of a plurality of different optical transports, and the optical receiver is configurable to conform to maximum power levels defined by each of for the plurality of different optical transports, and wherein the controller is configured to thereafter configure the ONT to conform to the optical transport of the optical network to which the ONT is coupled.

11. The ONT of claim 10, wherein the optical receiver includes the controller.

12. The ONT of claim 10, wherein the optical transport comprises at least one of a passive optical network (PON) transport and an Active Ethernet (AE) transport, and wherein the optical receiver is configurable to conform to overload levels of both the PON transport and the AE transport.

13. The ONT of claim 12, wherein the PON transport comprises at least one of a 622 mega-bits per second (Mbps) baseband PON (BPON) standard transport, a 1.2 gigabits per second (Gbps) gigabit PON (GPON) standard transport, and a 2.4 Gbps GPON standard transport, and the AE transport comprise a 1.2 Gbps AE standard transport.

14. The ONT of claim 10, wherein the controller detects a temperature and wherein the controller selects the bias voltage based on the detected temperature.

15. The ONT of claim 10, wherein the optical network device further comprises a memory, and wherein the controller retrieves from the memory data indicating a bias voltage level based on the optical transport to which the ONT is configured to determine the bias voltage that should be applied to the photodiode.

16. The ONT of claim 15, wherein the controller detects a temperature, and wherein the controller retrieves from the memory data indicating the bias voltage level based on the optical transport to which the ONT is configured and the temperature to determine the bias voltage that should be applied to the photodiode.

17. The ONT of claim 15, wherein the data indicating the bias voltage level stored in memory is based on a gain characteristic of the photodiode and a maximum input current level of the TIA.

18. The ONT of claim 15, wherein the data indicating the bias voltage level stored in memory is based on a maximum input current level of the TIA and a current generated by the photodiode when the photodiode is driven at the overload levels of the plurality of optical transports.

19. The device of claim 10, wherein the maximum current that the TIA of the optical receiver is configured to detect and receive a without overloading the TIA comprises a maximum current from which the TIA of the optical receiver is configured to detect logic ones and logic zeroes.

20. A computer readable storage medium comprising instructions that cause a controller comprising one or more processors to:

determine, as part of a start-up operation of an optical network terminal (ONT) that includes the controller, an optical transport of an optical network coupled to the ONT at least in part by configuring the ONT to operate with different optical transports until the controller determines that data received by the ONT conforms to one of the different optical transports for which the ONT is configured;

select, for each configuration of the ONT, a bias voltage for a photodiode of an optical receiver of the ONT and a media access control (MAC) layer functionality based on the identified optical transport to which the ONT is configured;

apply, for each configuration of the ONT, the selected bias voltage to the photodiode and the selected MAC layer functionality, wherein, when the ONT is configured to conform to the optical transport of the optical network, the selected bias voltage that is applied to the photodiode causes a current that the photodiode outputs, when the photodiode receives optical power at a maximum power level defined by the optical transport, to be less than or equal to a maximum current that a trans-impedance amplifier (TIA) of the optical receiver is configured to detect and receive without overloading, wherein the identified optical transport is one of a plurality of different optical transports, and the optical receiver is configurable to conform to maximum power levels defined by each of the plurality of different optical transports; and configure the ONT to thereafter conform to the optical transport of the optical network to which the ONT is coupled.

21. An optical network terminal (ONT) comprising:

means for determining, as part of a start-up operation of the ONT, an optical transport of an optical network coupled to the ONT at least in part by configuring the ONT to operate with different optical transports until determined that data received by the ONT conforms to one of the different optical transports for which the ONT is configured;

means for selecting, for each configuration of the ONT, a bias voltage for a photodiode of an optical receiver of the ONT and a media access control (MAC) layer functionality based on the optical transport to which the ONT is configured;

means for applying, for each configuration of the ONT, the selected bias voltage to the photodiode and the selected MAC layer functionality, wherein, when the ONT is configured to conform to the optical transport of the optical network, the selected bias voltage applied to the photodiode causes a current that the photodiode outputs, when the photodiode receives optical power at a maximum power level defined by the optical transport, to be less than or equal to a maximum current that a trans-impedance amplifier (TIA) of the optical receiver is configured to detect and receive without overloading, wherein the identified optical transport is one of a plurality of different optical transports, and the optical receiver is configurable to conform to maximum power levels defined by each of the plurality of different optical transports; and means for configuring the ONT to thereafter conform to the optical transport of the optical network to which the ONT is coupled.

* * * * *